(12) United States Patent
Nomura et al.

(10) Patent No.: US 7,102,805 B2
(45) Date of Patent: Sep. 5, 2006

(54) SCANNER HAVING SCAN ANGLE MULTIPLIER

(75) Inventors: Yujiro Nomura, Nagano-ken (JP); Ken Ikuma, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/913,943

(22) Filed: Aug. 6, 2004

(65) Prior Publication Data

US 2005/0057790 A1  Mar. 17, 2005

(30) Foreign Application Priority Data

| Aug. 8, 2003 | (JP) | ............................. 2003-290710 |
| Sep. 17, 2003 | (JP) | ............................. 2003-324197 |
| Sep. 22, 2003 | (JP) | ............................. 2003-329275 |

(51) Int. Cl.
*G02B 26/08* (2006.01)
(52) U.S. Cl. .................... 359/212; 359/196; 359/208; 347/243
(58) Field of Classification Search ............... 359/196, 359/197, 198, 212, 213–215, 223–225, 732; 310/181; 347/241, 243, 244, 256, 258, 259–261
See application file for complete search history.

(56) References Cited

U.S. PATENT DOCUMENTS

| 3,771,850 | A | * | 11/1973 | Casler | ....................... 359/202 |
| 5,486,945 | A | * | 1/1996 | Harris | ....................... 359/216 |
| 5,650,871 | A | * | 7/1997 | Wilson | ....................... 359/216 |
| 5,959,760 | A | * | 9/1999 | Yamada et al. | ............. 359/224 |
| 6,445,483 | B1 | * | 9/2002 | Takada et al. | ............. 359/207 |
| 2003/0142426 | A1 | * | 7/2003 | Turner | ....................... 359/872 |

* cited by examiner

*Primary Examiner*—Mark A. Robinson
*Assistant Examiner*—Pranav Khatri
(74) *Attorney, Agent, or Firm*—Hogan & Hartson LLP

(57) ABSTRACT

A transmission optical system comprises a concave surface mirror whose reflection surface is directed toward a deflection mirror surface and a transmission lens which is disposed between the concave surface mirror and the deflection mirror surface. A light beam deflected by a deflecting element at a first deflection angle is guided to the concave surface mirror via the transmission lens, and the light beam returned by the concave surface mirror is guided to the deflecting element via the transmission lens. In consequence, the deflecting element reflects the light beam twice, and the light beam is emitted toward a scanning lens at a second deflection angle which is larger than the first deflection angle.

16 Claims, 18 Drawing Sheets

F I G. 1
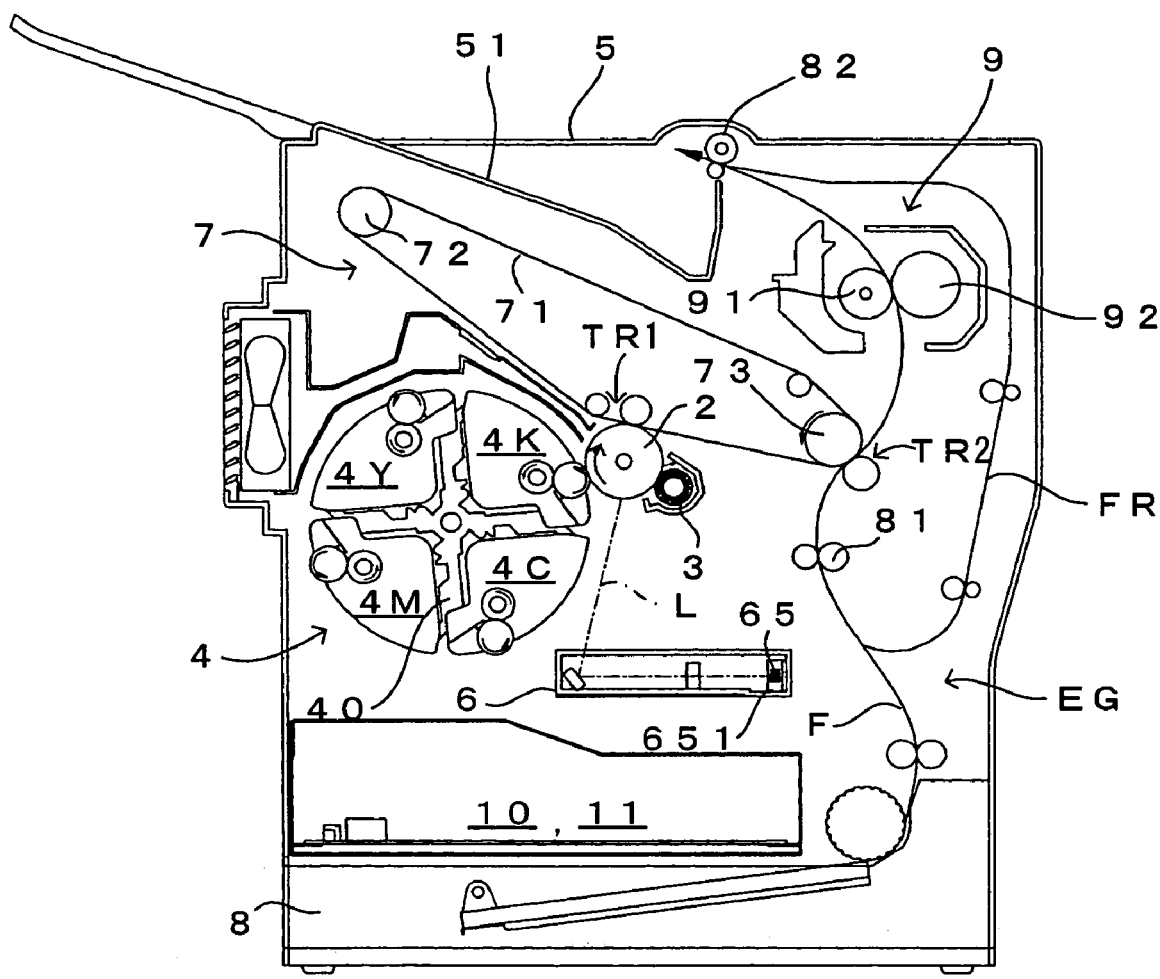

FIG. 13A : NO CORRECTION REALIZED BY TRANSMISSION OPTICAL SYSTEM
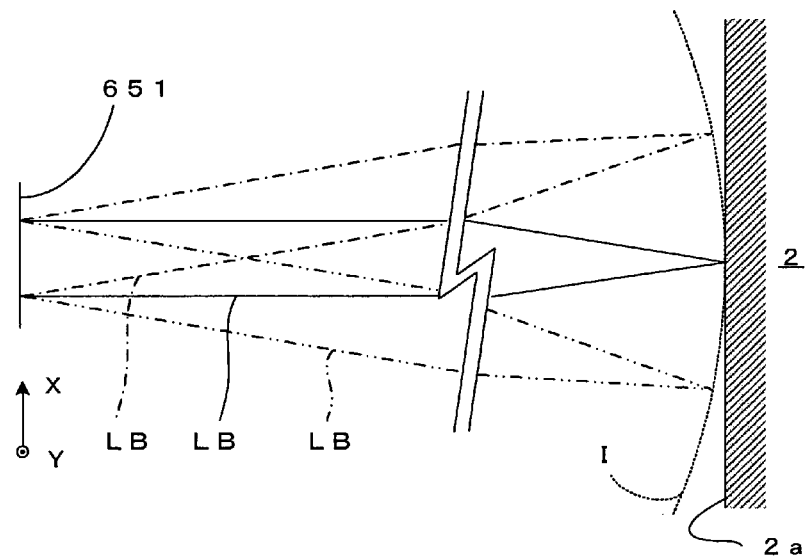
FIG. 13B : CORRECTION REALIZED BY TRANSMISSION OPTICAL SYSTEM
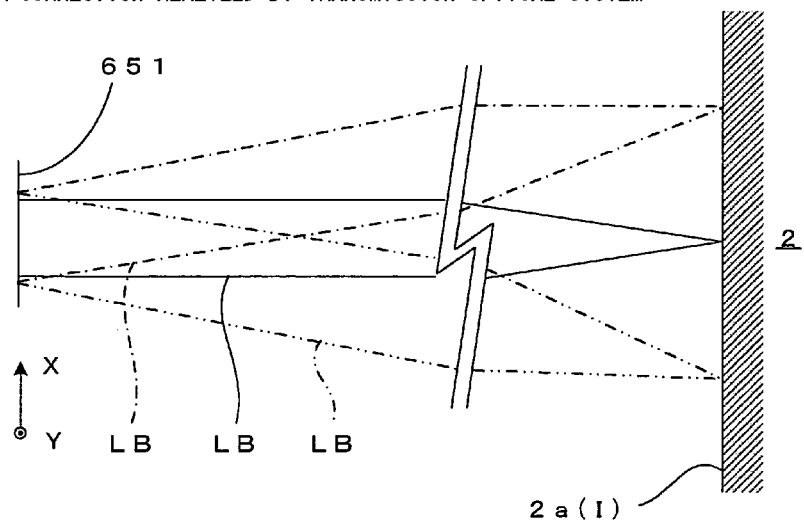

FIG. 15A : NO CORRECTION REALIZED BY TRANSMISSION OPTICAL SYSTEM
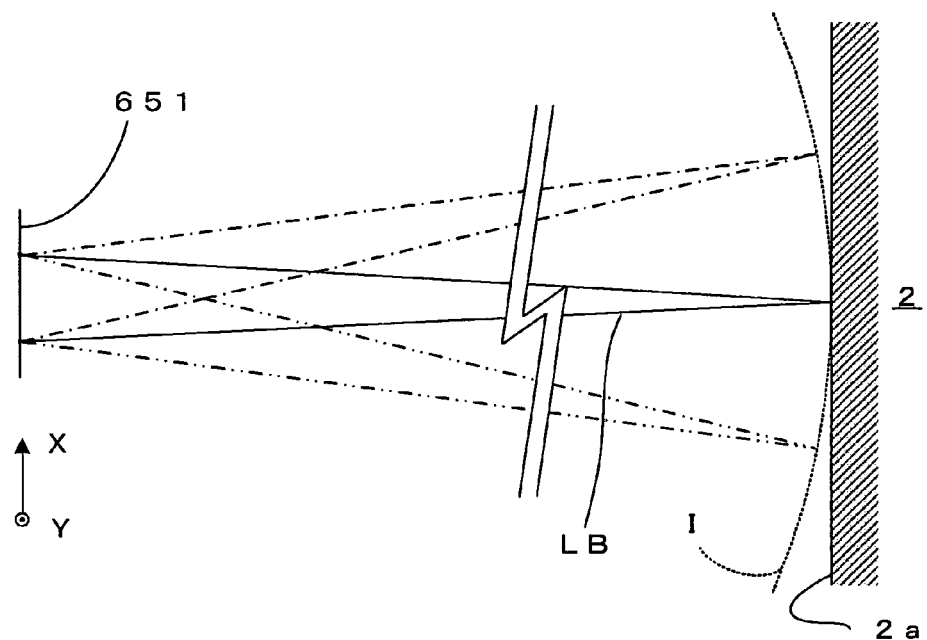
FIG. 15B : CORRECTION REALIZED BY TRANSMISSION OPTICAL SYSTEM
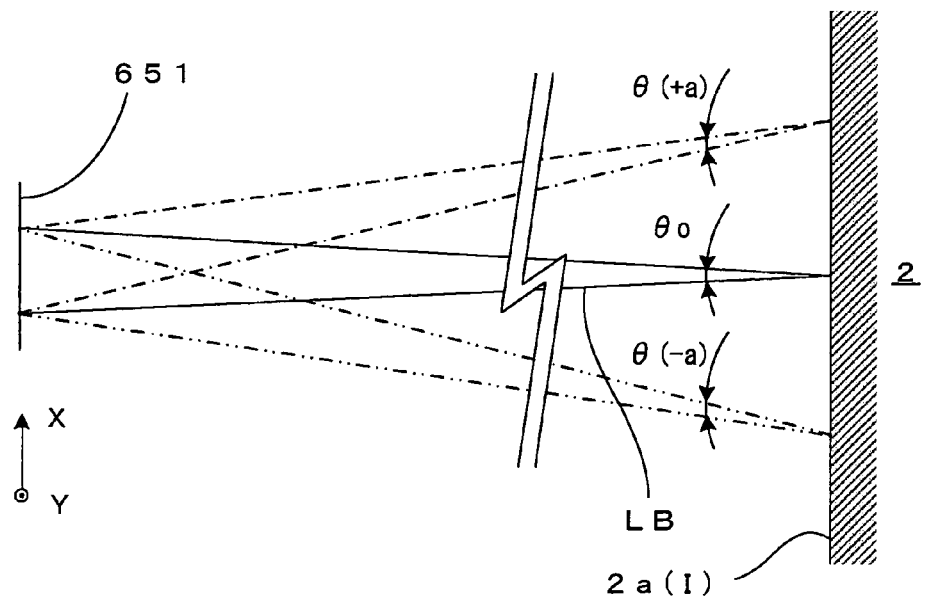

SCANNER HAVING SCAN ANGLE MULTIPLIER

CROSS REFERENCE TO RELATED APPLICATION

The disclosure of Japanese Patent Applications enumerated below including specification, drawings and claims is incorporated herein by reference in its entirely:
No.2003-290710 filed Aug. 8, 2003;
No.2003-324197 filed Sep. 17, 2003; and
No.2003-329275 filed Sep. 22, 2003.

BACKGROUND OF THE INVENTION

1. Field of the Invention

The present invention relates to an optical scanning apparatus in which a light beam from a light source is deflected and scans, and in particular, to an optical scanning apparatus in which a light beam impinges upon a deflecting element a plurality of times and a deflection angle accordingly increases, and also to an image forming apparatus which comprises such an optical scanning apparatus.

2. Description of the Related Art

In an attempt to increase a deflection angle, a conventional optical scanning apparatus for use within an image forming apparatus such as a laser beam printer, a copier machine and a facsimile machine in some cases uses a structure that a deflecting element deflects a light beam a plurality of times. For instance, in the optical scanning apparatus described in U.S. Pat. No. 3,771,850, a light beam deflected by a deflection mirror surface of a deflecting element is guided back to the deflection mirror surface once again and the deflection angle of the light beam thus deflected for the second time accordingly increases. The light beam then emitted from the deflecting element is guided upon a surface-to-be-scanned through a scanning lens. The scanning speed of the light beam increases in this manner as the light beam impinges upon the deflecting element a plurality of times.

SUMMARY OF THE INVENTION

A transmission optical system is disposed within the conventional apparatus above so as to guide a light beam deflected by a deflection mirror surface of a deflecting element back again to the deflection mirror surface, and the transmission optical system is comprised of two transmission lenses and a flat surface mirror. In other words, the flat surface mirror is disposed at a distance (2f1+2f2) away from the deflecting element. The symbols f1 and f2 respectively denote the focal lengths of the two transmission lenses, namely, the first and the second transmission lenses. Further, the first transmission lens is located between the deflecting element and the flat surface mirror such that the first transmission lens is closer to the flat surface mirror and away from the deflecting element by the distance f1, and the second transmission lens is disposed away from the first transmission lens by a distance (f1+f2). Having such a lens arrangement, the transmission optical system is a so-called afocal optical system.

Since the plurality of transmission lenses are used in this manner, the transmission optical system is complex and contains a great number of optical components. In addition, the long distance between the deflecting element and the flat surface mirror increases the size of the optical scanning apparatus (self-amplified deflection/scanning optical system) in which a light beam impinges a plurality of times upon the deflecting element and a deflection angle accordingly increases. Further, use of the plurality of transmission lenses also gives rise to another problem: The wavelength of the light beam changes as an environment surrounding the apparatus, in particular an ambient temperature, changes and the apparatus comprising the plurality of transmission lenses is largely influenced by chromatic aberration of the lenses. In other words, a change of the environment surrounding the apparatus greatly changes the optical characteristics of the transmission optical system. This may sometimes make the scan characteristic of the light beam instable, and deteriorate the quality of an image formed on a surface-to-be-scanned.

Further, the conventional apparatus generally uses spherical lenses as the transmission lenses. For this reason, it is not possible to eliminate the influence of aberration such as spherical aberration. Due to the influence of aberration, it is not possible to obtain a desired trace of the light beam at a location away from the optical axis of the transmission optical system, which is one of main factors which deteriorate the scannability. In the optical scanning apparatus described above in particular, aberration caused within the transmission optical system is twice influential since the transmission optical system returns the deflected light beam from the deflecting element back to the deflecting element once again. The influence of aberration is thus severe. For instance, when the principal ray of the light beam returned by the transmission optical system back to the deflecting element deviates owing to the influence of aberration from the center of the deflection mirror surface, shading of the light beam, vignetting or the like occurs.

In addition, in an optical scanning apparatus of this type, after shaping a light beam from a light source into a parallel beam, the parallel light beam is made incident upon a deflecting element and then emitted from deflecting element toward a surface-to-be-scanned. While a transmission optical system is formed as an afocal optical system for the purpose of ensuring that a light beam is parallel, the light beam emitted from deflecting element sometimes fails to become a parallel beam because of the influence of aberration and instead becomes a convergent light beam or a divergent light beam. This leads to a problem that it is not possible to irradiate the surface-to-be-scanned with a light beam whose spot size is proper.

Optical scanning apparatuses of this type are of either the so-called pre-objective scan type that a beam is deflected before a scanning lens (imaging means), i.e., on the light source side or the so-called post-objective scan type that a beam is deflected behind a condenser lens (imaging means), i.e., on the surface-to-be-scanned side.

Of these, in an optical scanning apparatus of the pre-objective scan type, after shaping a light beam from a light source into a parallel beam, the parallel light beam is made incident upon a deflecting element twice and emitted from deflecting element toward a surface-to-be-scanned. With this parallel light condensed by a scanning lens (imaging means) on the surface-to-be-scanned, a spot-like image is formed. Where a light beam deflected by the deflecting element is imaged in this manner on the surface-to-be-scanned using the scanning lens, a major challenge is suppression of curvature of field caused by the scanning lens. A conventional approach to solve this problem is to form a scanning lens system (imaging means) using a plurality of lenses. However, a conventional apparatus has a problem that the apparatus as a whole tends to be large, lens-to-lens optical adjustment is difficult, and since a number of components is required, it is hard to reduce costs.

Meanwhile, in an optical scanning apparatus of the post-objective scan type, a light beam from a light source is made incident upon a deflecting element via a condenser lens (imaging means). After the light beam deflected by the deflecting element is made incident upon the deflecting element using a transmission optical system once again, the light beam thus reflected and deflected by the deflecting element is guided directly onto a surface-to-be-scanned and the surface-to-be-scanned is accordingly optically scanned. Even in such an apparatus, it is necessary that the condenser lens (imaging means) is formed with a plurality of lenses, in order to obtain excellent scannability while suppressing curvature of field associated with the condenser lens. This therefore gives rise to a problem that as in an apparatus of the pre-objective scan type, lens-to-lens optical adjustment is difficult, and since a number of components is required, it is hard to reduce costs.

A principal object of the present invention is to provide a compact optical scanning apparatus having a simple structure which achieves stable scanning with a light beam and provide an image forming apparatus which comprises such an optical scanning apparatus.

According to a first aspect of the present invention, a transmission optical system in an optical scanning apparatus comprises a concave surface mirror and a transmission lens, the concave surface mirror being disposed such that a reflection surface of the concave surface mirror is directed toward a deflecting element, the transmission lens being disposed between the concave surface mirror and the deflecting element. A light beam deflected by the deflecting element is guided to the concave surface mirror via the transmission lens while the light beam returned by the concave surface mirror is guided to the deflecting element via the transmission lens, thereby ensuring that the deflection angle of the light beam emitted toward a surface-to-be-scanned after deflected by the deflecting element once again becomes larger than the deflection angle of the light beam impinging upon the transmission optical system.

According to a second aspect of the present invention, a deflecting element in an optical scanning apparatus deflects a light beam from a light source while a transmission optical system guides thus deflected light beam to the deflecting element, whereby the deflection angle of the light beam emitted toward a surface-to-be-scanned after deflected by the deflecting element once again becomes larger than the deflection angle of the light beam impinging upon the transmission optical system. The transmission optical system comprises two optical elements each of which has a power, the two optical elements being disposed in a such a manner that image surfaces formed respectively by the two optical elements approximately coincide with each other at an intermediate image position.

According to a third aspect of the present invention, a deflecting element in an optical scanning apparatus deflects a light beam from a light source while a transmission optical system guides thus deflected light beam to the deflecting element, whereby the light beam is emitted to an imaging element after deflected by the deflecting element once again. The transmission optical system exhibits such an imaging characteristic which corrects curvature of field created by the imaging element.

According to a fourth aspect of the present invention, the imaging element in an optical scanning apparatus condenses a light beam from a light source, the condensed light beam impinges upon a deflecting element and is deflected, a transmission optical system guides thus deflected light beam to the deflecting element, the deflecting element deflects the light beam again, and the light beam is emitted toward a surface-to-be-scanned. The transmission optical system exhibits such an imaging characteristic which corrects curvature of field created by the imaging element.

According to a fifth aspect of the present invention, an image forming apparatus comprises: a latent image carrier; an exposure unit, having the same structure as one of the first through fourth aspects, which makes the light beam scan on the surface-to-be-scanned which is a surface of the latent image carrier, and accordingly forms an electrostatic latent image on the latent image carrier; and a developer unit which develops the electrostatic latent image with toner, thereby forming a toner image.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIG. 1 is a drawing of an image forming apparatus equipped with an exposure unit which is a first embodiment of an optical scanning apparatus according to the present invention;

FIGS. 13A and 13B are drawings for describing an operation performed by a transmission optical system to correct curvature of field in the fifth embodiment;

FIGS. 15A and 15B are drawings for describing an operation performed by the transmission optical system to correct curvature of field in the seventh embodiment;

DETAILED DESCRIPTION OF THE PREFERRED EMBODIMENTS

<First Embodiment>

Figure 2:
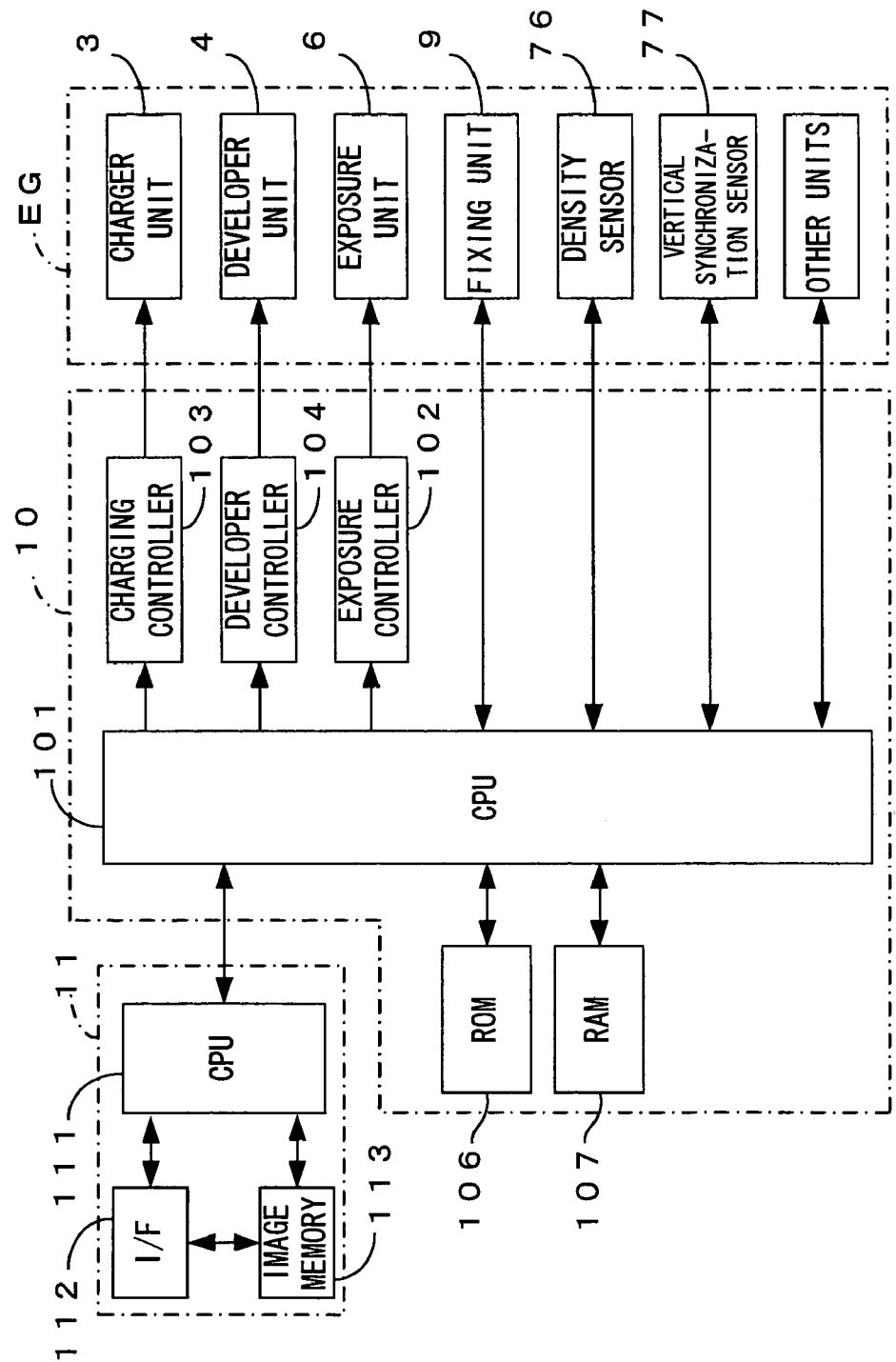
FIG. 2 is a block diagram showing the electric structure of the image forming apparatus which is shown in FIG. 1.

FIG. 1 is a drawing of an image forming apparatus equipped with an exposure unit which is a first embodiment of an optical scanning apparatus according to the present invention. FIG. 2 is a block diagram showing the electric structure of the image forming apparatus which is shown in FIG. 1. This image forming apparatus is a color printer of the so-called 4-cycle method. In this image forming apparatus, when a print command is fed to a main controller 11 from an external apparatus such as a host computer in response to an image formation request from a user, an engine controller 10 controls respective portions of an engine part EG in accordance with the print command from a CPU 111 of the main controller 11, and an image which corresponds to the print command is formed on a sheet which may be a copy paper, a transfer paper, a plain paper or a transparency for an overhead projector.

In the engine part EG, a photosensitive member 2 is disposed so that the photosensitive member 2 can freely rotate in the arrow direction (sub scanning direction) shown in FIG. 1. Around the photosensitive member 2, a charger unit 3, a rotary developer unit 4 and a cleaner (not shown) are disposed along the direction of rotations of the photosensitive member 2. A charging controller 103 is electrically connected with the charger unit 3, and a predetermined charging bias is applied upon the charger unit 3. The bias application uniformly charges an outer circumferential surface of the photosensitive member 2 to a predetermined surface potential. The photosensitive member 2, the charger unit 3 and the cleaner form one integrated photosensitive member cartridge which can be freely attached to and detached from a main section 5 of the apparatus as one integrated unit.

An exposure unit 6 which corresponds to the optical scanning apparatus of the present invention emits a light beam L toward the outer circumferential surface of the photosensitive member 2 which is thus charged by the charger unit 3. The exposure unit 6 makes the light beam L expose on the photosensitive member 2 (which corresponds to the "surface-to-be-scanned" of the present invention) in accordance with an image signal fed from the external apparatus, whereby an electrostatic latent image which corresponds to the image signal is formed. The structure and operations of the exposure unit 6 will be described in detail later.

The developer unit 4 develops thus formed electrostatic latent image with toner. In other words, in this embodiment, the developer unit 4 comprises a support frame 40 which is disposed for free rotations about an axis, and a yellow developer 4Y, a magenta developer 4M, a cyan developer 4C and a black developer 4K which house toner of the respective colors and are formed as cartridges which are freely attachable to and detachable from the support frame 40. The developer unit 4 is driven into rotations in response to a control command given from a developer controller 104 of the engine controller 10. When the developers 4Y, 4C, 4M and 4K are selectively positioned at a predetermined developing position which abuts on the photosensitive member 2 or is faced with the photosensitive member 2 over a predetermined gap, toner of the color corresponding to the selected developer is supplied onto the surface of the photosensitive member 2 from a developer roller which is disposed to the selected developer and carries toner of the selected color. As a result, the electrostatic latent image on the photosensitive member 2 is visualized in the selected toner color.

A toner image developed by the developer unit 4 in the manner above is primarily transferred onto an intermediate transfer belt 71 of a transfer unit 7 in a primary transfer region TR1. The transfer unit 7 comprises the intermediate transfer belt 71 which runs across a plurality of rollers 72 and 73, and a driver (not shown) which drives the roller 73 into rotations to thereby rotate the intermediate transfer belt 71 in a predetermined rotation direction.

Further, there are a transfer belt cleaner (not shown), a density sensor 76 (FIG. 2) and a vertical synchronization sensor 77 (FIG. 2) in the vicinity of the roller 72. Of these, the density sensor 76 is disposed facing a surface of the intermediate transfer belt 71 and measures the optical density of a patch image formed on an outer circumferential surface of the intermediate transfer belt 71. Meanwhile, the vertical synchronization sensor 77 is a sensor which detects a reference position of the intermediate transfer belt 71, and serves as a vertical synchronization sensor for obtaining a synchronizing signal outputted in relation to rotations of the intermediate transfer belt 71 in the sub scanning direction, namely, a vertical synchronizing signal Vsync. In this apparatus, for the purpose of aligning the timing at which the respective portions operate and accurately overlaying toner images of the respective colors on top of each other, the operations of the respective portions of the apparatus are controlled based on the vertical synchronizing signal Vsync.

For transfer of color images on sheets, the toner images of the respective colors formed on the photosensitive member 2 are overlaid each other on the intermediate transfer belt 71, thereby forming color images which will then be secondarily transferred onto sheets which have been taken out one by one from a cassette 8 and transported on a transportation path F to a secondary transfer region TR2.

At this stage, in order to properly transfer the images carried by the intermediate transfer belt 71 onto a sheet at a predetermined position, the timing of feeding the sheet to the secondary transfer region TR2 is controlled. To be specific, there is a gate roller 81 disposed in front of the secondary transfer region TR2 on the transportation path F, and as the gate roller 81 rotates in synchronization to the timing of rotations of the intermediate transfer belt 71, the sheet is fed into the secondary transfer region TR2 at predetermined timing.

Further, the sheet now bearing the color image is transported to a discharge tray part 51, which is disposed to a top surface portion of the main section 5 of the apparatus, through a fixing unit 9 and a discharge roller 82. When images are to be formed on the both surfaces of a sheet, the discharge roller 82 moves the sheet seating an image on its one surface in the manner above in a switch back motion. The sheet is therefore transported along a reverse transportation path FR. While the sheet is returned back to the transportation path F again before arriving at the gate roller 81, the surface of the sheet which abuts on the intermediate transfer belt 71 in the secondary transfer region TR2 and is to receive a transferred image is, at this stage, the opposite surface to the surface which already bears the image. In this fashion, it is possible to form images on the both surfaces of the sheet.

In FIG. 2, denoted at 113 is an image memory disposed in the main controller 11 so as to store image data fed from an external apparatus such as a host computer via an interface 112. Denoted at 106 is a ROM which stores a calculation program executed by a CPU 101, control data for control of the engine part EG, etc. Denoted at 107 is a RAM which temporarily stores a calculation result derived by the CPU 101, other data, etc.

Figure 3:
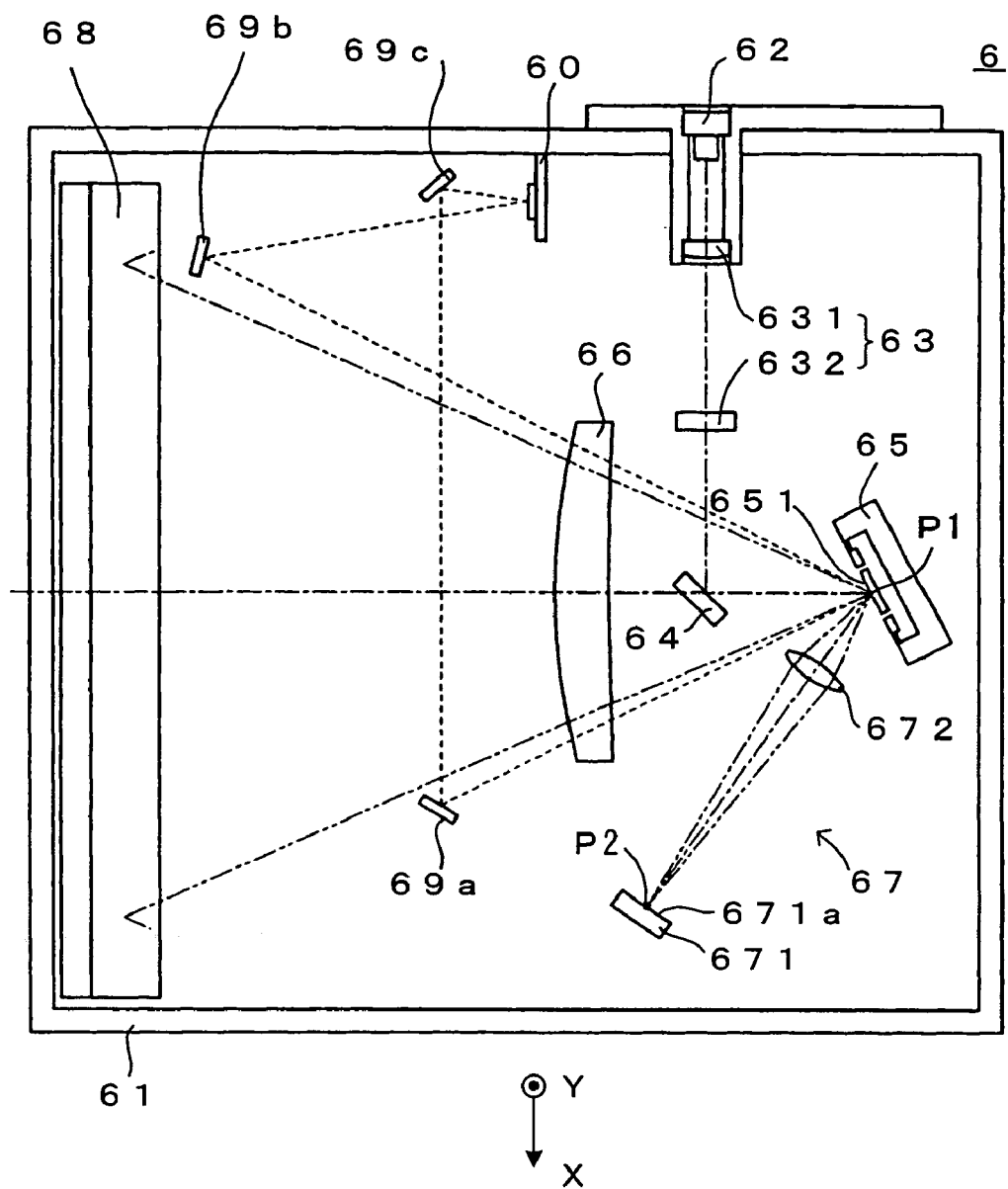
FIGS. 3 and 4 are main-scanning cross sectional views showing the structure of the exposure unit (optical scanning apparatus) which is disposed in the image forming apparatus which is shown in FIG. 1.
Figure 4:
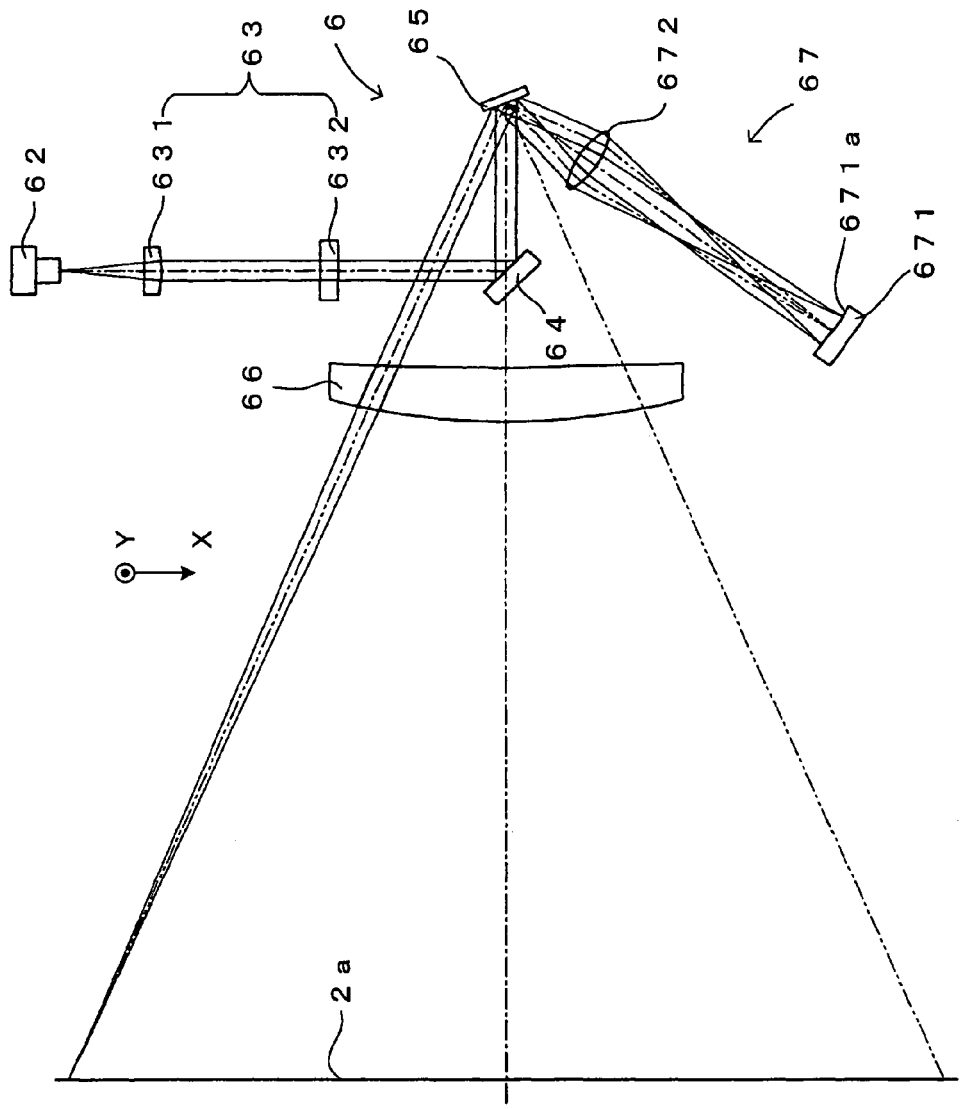
Figure 5:
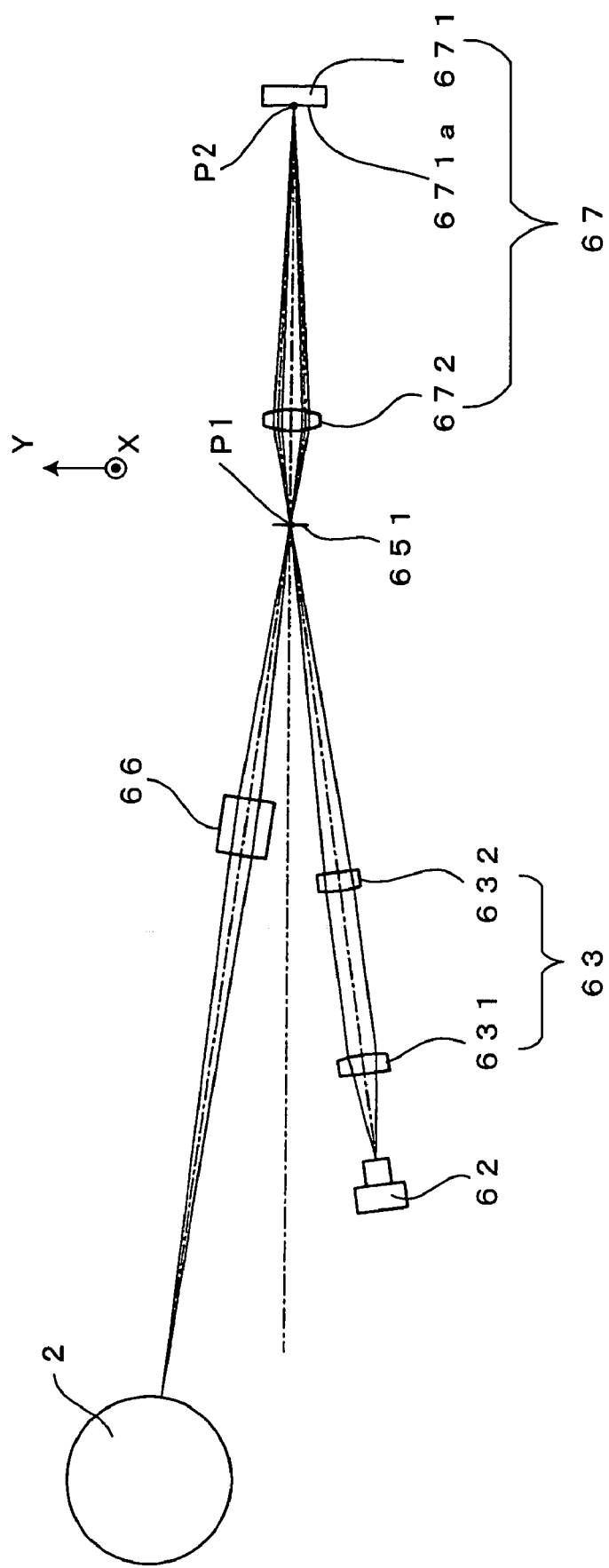
FIG. 5 is a sub-scanning cross sectional view showing the structure of the exposure unit (optical scanning apparatus) which is disposed in the image forming apparatus which is shown in FIG. 1.
Figure 6:
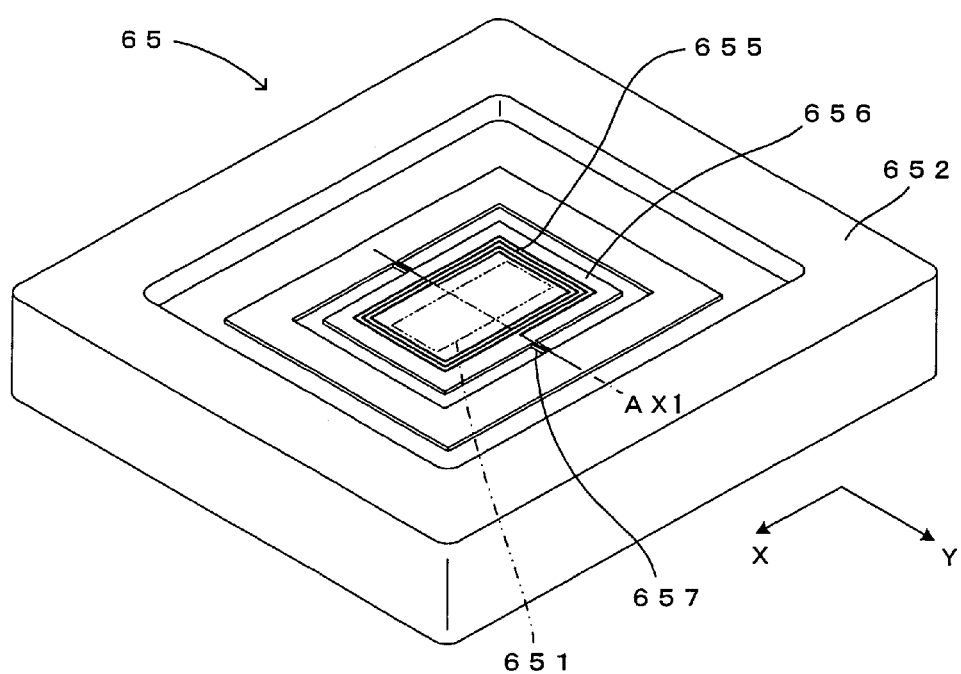
FIGS. 6 and 7 are drawings of a deflecting element which is one of components which form the exposure unit.
Figure 7:
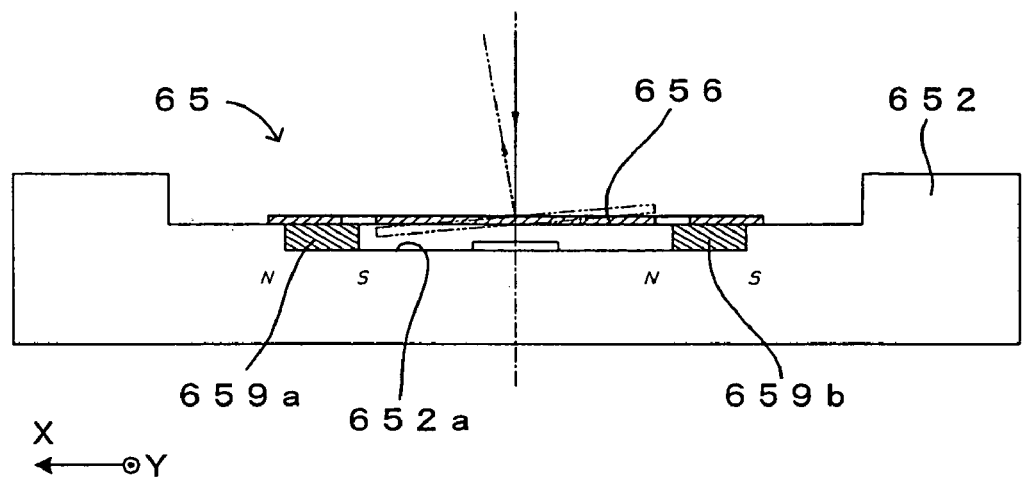
Figure 8:
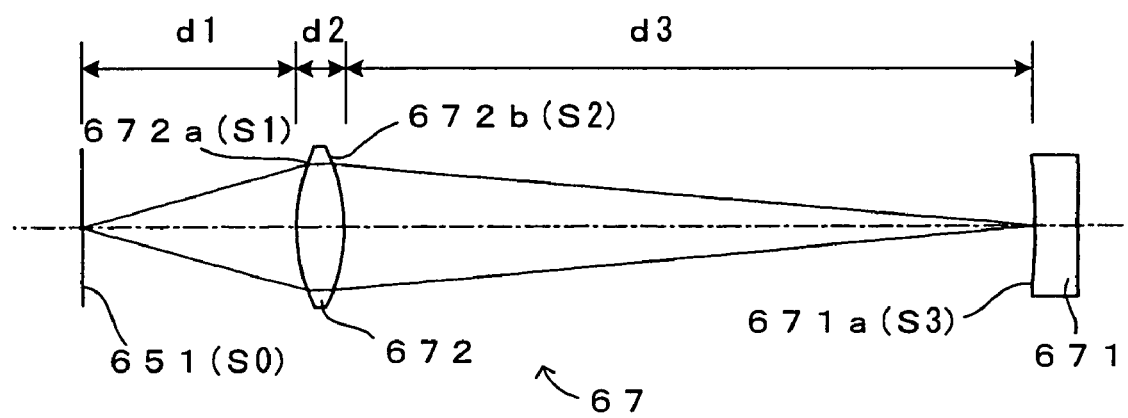
FIG. 8 is a drawing of a transmission optical system which is one of components which form the exposure unit.

FIGS. 3 and 4 are main-scanning cross sectional views showing the structure of the exposure unit (optical scanning apparatus) which is disposed in the image forming apparatus which is shown in FIG. 1. FIG. 5 is a sub-scanning cross sectional view showing the structure of the exposure unit which is disposed in the image forming apparatus which is shown in FIG. 1. FIGS. 6 and 7 are drawings of a deflecting element which is one of components which form the exposure unit. FIG. 8 is a drawing of a transmission optical system which is one of components which form the exposure unit. The structure and operations of the exposure unit will now be described in detail with reference to these drawings.

The exposure unit 6 comprises an exposure housing 61. A single laser source 62 is fixed to the exposure housing 61, permitting emission of a light beam from the single laser source 62. The single laser source 62 is electrically connected with a light source driver (not shown) of an exposure controller 102. The light source driver controls ON and OFF of the laser source 62 in accordance with image data, and the laser source 62 emits a light beam modulated in accordance with the image data.

Further, to make the light beam from the single laser source 62 scan and expose a surface 2a of the photosensitive member 2, a collimator lens 631, a cylindrical lens 632, a deflecting element 65, a scanning lens 66 which corresponds to the "imaging element" of the present invention, a transmission optical system 67 and a return mirror 68 are disposed inside the exposure housing 61. In short, after shaped into collimated light of a proper size by the collimator lens 631, the light beam from the single laser source 62 impinges upon the cylindrical lens 632 which has power only along the sub scanning direction as shown in FIG. 5. The collimated light converges only in the sub scanning direction and is imaged in the shape of a line in the vicinity of a deflection mirror surface 651 of the deflecting element 65. In this embodiment, the collimator lens 631 and the cylindrical lens 632 thus function as a beam shaper system 63 which shapes the light beam from the single laser source 62.

The deflecting element 65 is made using a micro machining technique which is an application of semiconductor manufacturing techniques and aims at forming an integrated micro machine on a semiconductor substrate. The deflecting element 65 is capable of deflecting a light beam reflected by the deflection mirror surface 651 in the main scanning direction X. To be more specific, the deflecting element 65 has the following structure.

As shown in FIG. 6, in the deflecting element 65, a single crystal substrate of silicon (hereinafter referred to merely as a "silicon substrate") 652 functions as the "support member" of the present invention, and a movable plate 656 which is obtained by partially processing the silicon substrate 652 is disposed. The movable plate 656 is like a flat panel, elastically supported to the silicon substrate 652 by a helical spring 657, and capable of freely pivoting about a first axis AX1 which is approximately parallel to the sub scanning direction Y Further, a flat coil 655 is electrically connected via the helical spring 657 with a pair of outer electrode terminals (not shown) disposed to the top surface of the silicon substrate 652, and coated with an insulation layer. In a central portion of the top surface of the movable plate 656, an aluminum film or the like is disposed as the deflection mirror surface 651.

There is a recess 652a approximately at the center of the silicon substrate 652 as shown in FIG. 7, which makes it possible for the movable plate 656 to pivot about the first axis AX1. In an inner bottom surface of the recess 652a, permanent magnets 659a and 659b are fixed in mutually different directions at outer positions to the both ends of the movable plate 656. The flat coil 655 is electrically connected with a driver (not shown) of an exposure controller 102, due to which as the coil 655 is energized, Lorentz's force acts because of the direction of the current flowing in the flat coil 655 and the direction of magnetic flux created by the permanent magnets 659a and 659b and moment accordingly develops which rotates the movable plate 656. As a result, the movable plate 656 (deflection mirror surface 651) pivots about the helical spring 657 which serves as the first axis AX1. When an alternating current is supplied as the current flowing in the flat coil 655 for continuous cyclic operations, the deflection mirror surface 651 vibrates reciprocally about the helical spring 657 which serves as the first axis AX1. If the drive frequency of the reciprocal vibrations is set to the resonance frequency of the deflection mirror surface 651, the deflection mirror surface 651 vibrates at a large amplitude in a sustainably stable manner.

Thus, with respect to the deflecting element 65, the driver of the exposure controller 102 functions as the "mirror driver" of the present invention. With the driver controlled, the deflection mirror surface 651 pivots about the first axis AX1, the light beam is deflected and scans in the main scanning direction X. That is, the first axis AX1 functions as a main scanning/deflection axis.

The light beam reflected by the deflecting element 65 having such a structure described above impinges upon the transmission optical system 67 and then is returned by the transmission optical system 67 back to the deflection mirror surface 651 of the deflecting element 65. Hence, the light beam deflected by the deflecting element 65 at a first deflection angle for instance is emitted toward the scanning lens 66 at a second deflection angle which is larger than the first deflection angle. In this embodiment, the transmission optical system 67 has the following structure.

FIG. 8 is a drawing which shows the structure of the transmission optical system. The transmission optical system 67 comprises a concave surface mirror 671 whose reflection surface 671a is directed toward the deflection mirror surface 651 and a transmission lens 672 which is disposed between the concave surface mirror 671 and the deflection mirror surface 651. As shown in FIGS. 4 and 5, the light beam deflected by the deflecting element 65 at the first deflection angle is guided to the concave surface mirror 671 via the transmission lens 672, and the light beam returned by the concave surface mirror 671 is guided to the deflecting element 65 via the transmission lens 672. In consequence, the deflecting element 65 reflects the light beam once again, and the light beam is emitted toward the scanning lens 66 at the second deflection angle which is larger than the first deflection angle.

The specific structure of the transmission optical system 67 having such a characteristic may be one which realizes optical data shown in Table 1.

TABLE 1

| SURFACE $S_i$ | RADIUS OF CURVATURE $r_i$ | SURFACE SEPARATION $d_i$ | INDEX OF REFRACTION $n_i$ |
|---|---|---|---|
| $S_0$ | | 30 | (DEFLECTION SURFACE) |
| $S_1$ | $r_1 = 35.2539$<br>$K_1 = -1.053046$<br>$A_1 = 0.146894 \times 10^4$ | 10 | 1.51452 |
| $S_2$ | $r_2 = -17.9350$<br>$K_2 = -2.096751$<br>$A_2 = 0.195079 \times 10^4$ | 100 | |
| $S_3$ | $r_2 = -79.0000$ | | (REFLECTION SURFACE) |

In this design example, the two surfaces S1 and S2 of the transmission lens 672 which forms the transmission optical system 67 are axisymmetric aspheric surfaces. The symbols used in the table denote the following:

Si: lens surface number (However, S0 denotes the deflection mirror surface 651 while S3 denotes the reflection surface 671a)

ri: the radius of curvature of the lens surface i di: the axial distance from the lens surface i to the lens surface (i+1)

ni: the index of refraction of the lens surface i

Ki, Ai: the aspherical coefficients of the axisymmetric aspheric surfaces expressed by the following formula when the lens surface i is an axisymmetric aspheric surface $$z_i = \frac{y^2/r_i}{1 + \sqrt{1 - (K_i + 1)(y/r_i)^2}} + A_i y^4$$

where the symbol z denotes a distance from the tangential plane to the aspheric surface apex among aspheric points which is at the height y from the optical axis.

The exposure unit 6 will now be described further referring back to FIGS. 3 and 4. After impinging upon the deflecting element 65 twice, the light beam is emitted from the deflecting element 65 toward the photosensitive member 2, and this light beam is irradiated upon the surface (surface-to-be-scanned) 2a of the photosensitive member 2 via the scanning lens 66 which corresponds to the "imaging element" of the present invention and the return mirror 68. As a result, the light beam scans parallel to the main scanning direction X and a line-shaped latent image extending in the main scanning direction X is formed on the surface 2a of the photosensitive member 2 as shown in FIG. 4.

In this embodiment, as shown in FIG. 3, at the start or end of the scanning light beam, return mirrors 69a through 69c guide the scanning light beam emitted from the deflecting element 65 to a synchronization sensor 60. In other words, the synchronization sensor 60 functions as a horizontal synchronization reading sensor which is for obtaining a synchronizing signal in the main scanning direction X, namely, a horizontal synchronizing signal Hsync.

As described above, in this embodiment, the transmission optical system 67 is formed by the concave surface mirror 671 and the transmission lens 672. The transmission optical system 67 guides the light beam deflected by the deflecting element 65 to the concave surface mirror 671 via the transmission lens 672, and makes the light beam reflected by the reflection surface 671a of the concave surface mirror 671 incident upon the deflecting element 65 via the transmission lens 672, thereby increasing a deflection angle. In this manner, the transmission optical system 67 is formed by less lenses. In short, as compared with a conventional apparatus to which a plurality of transmission lenses are essential to form a transmission optical system, the transmission optical system 67 is formed simple using a smaller number of optical components. This also reduces the size of the transmission optical system 67, and hence, the exposure unit 6. Further, since less transmission lenses are required, it is possible to suppress the influence of chromatic aberration and realize stable scanning with the light beam.

Further, in the embodiment and the design example above, since the transmission lens 672 and the concave surface mirror 671 are disposed in such a manner that the focal point of the transmission lens 672 approximately coincides with the center of the concave surface mirror 671, the following effect is obtained: By means of this structure, as shown in FIGS. 3 and 5, a position of reflection P1 at which the deflecting element 65 reflects the light beam and a position of reflection P2 at which the concave surface mirror 671 reflects the light beam are approximately conjugated relative to each other. Hence, the light beam reflected by the deflecting element 65 at the particular position is guided back to this particular position by the transmission optical system 67, reflected at this particular position and emitted toward the imaging element. In other words, the light beam impinges upon the deflecting element 65 twice, each time at this particular position. This allows size reduction of the area of the deflecting element 65 where the light beam is reflected, and hence, size reduction of the deflecting element 65 and the apparatus. As the deflecting element 65 is made smaller and lighter, the speed at which the deflecting element 65 is driven further improves, thereby further enhancing the scanning speed of the light beam.

In addition, the transmission optical system 67 is disposed outside the scanning area which the scanning optical system (i.e., the deflecting element 65 and the scanning lens 66) scans with the light beam in this embodiment as shown in FIG. 5. This prevents interference between the light beam and the transmission optical system 67. This also simplifies incidence of the light beam upon the transmission optical system 67 and emission of the light beam from the transmission optical system 67, and therefore, achieves thickness reduction of the apparatus.

While a spherical lens may be used as the transmission lens 672, as described above, use of an aspheric lens described above achieves the following effect. When a spherical lens is used as the transmission lens, it is difficult to suppress the influence of various types of aberration, thereby in some cases giving rise to problems such as (i) the principal ray of the light beam returning back to the deflecting element 65 fails to return to a pre-designed desired position on the deflecting element 65 and (ii) the parallelism of the light beam coming from the transmission optical system 67 and impinging upon the deflecting element 65 is destroyed. In contrast, when the transmission lens 672 is formed by an aspheric lens, various types of aberration mentioned above are corrected and favorable optical characteristics are obtained.

Still further, in the embodiment and the design example above, as shown in FIG. 5, the position of reflection P1 at which the deflecting element 65 reflects the light beam and the surface-to-be-scanned (the surface 2a of the photosensitive member 2) are approximately conjugated relative to each other within a sub scanning plane which is approximately perpendicular to the main scanning direction X in which the scanning optical system scans with the light beam. This effectively prevents pivoting of the deflecting element 65 in the sub scanning direction Y from becoming influential, and hence, lens surface tilting. This also reduces the size of the deflecting element 65 in the sub scanning direction, whereby the deflecting element 65 becomes small and light. In consequence, the speed at which the deflecting element 65 is driven further improves and the scanning speed of the light beam becomes even faster.

Although the deflection mirror surface 651 vibrates owing to electromagnetic force in the embodiment above, other drive force may be used to make the deflection mirror surface 651 vibrate. The other drive force may be static electricity force for instance.

<Second Embodiment>

Figure 9:
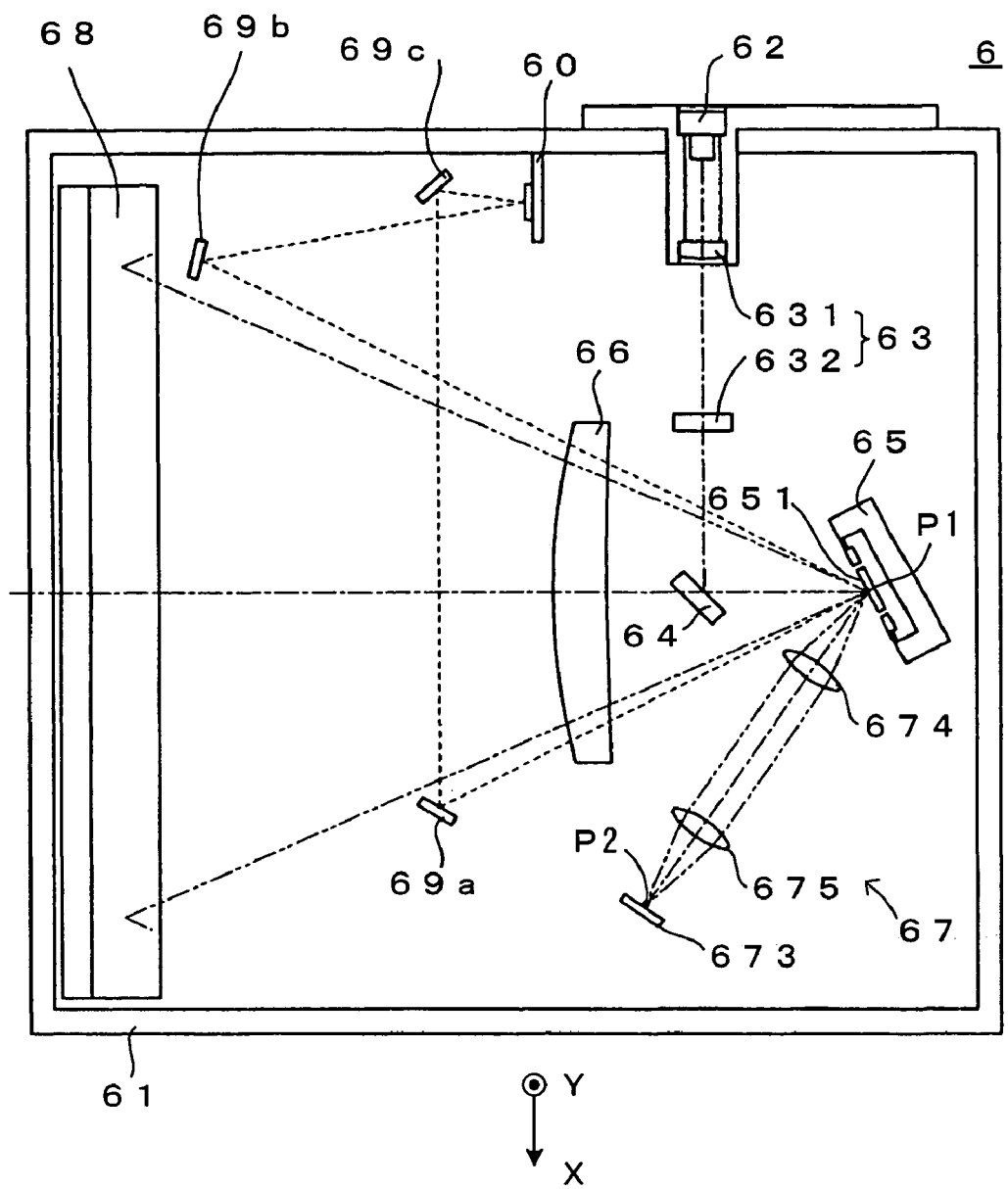
FIG. 9 is a drawing of a second embodiment of the optical scanning apparatus (exposure unit) according to the present invention.
Figure 10:
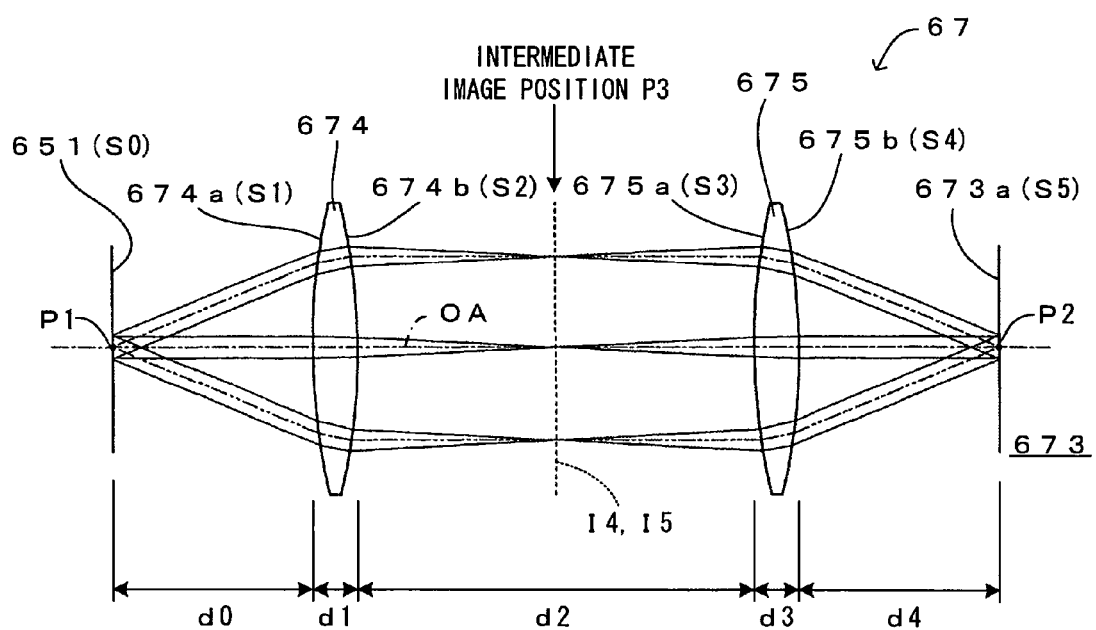
FIG. 10 is a drawing of a transmission optical system which is one of components which form the exposure unit which is shown in FIG. 9.

FIG. 9 is a drawing of a second embodiment of the optical scanning apparatus (exposure unit) according to the present invention. FIG. 10 is a drawing of a transmission optical system which is one of components which form the exposure unit. A major difference of the second embodiment from the first embodiment lies in the structure of the transmission optical system 67, and the other structures are similar to those according to the first embodiment. Hence, the structure and operations of the transmission optical system will be mainly described below.

The transmission optical system 67 comprises a reflection mirror 673 which is disposed with its reflection surface 673a directed toward the deflection mirror surface 651, and two transmission lenses 674 and 675 which are disposed between the reflection mirror 673 and the deflection mirror surface 651. As shown in FIG. 9, the light beam deflected by the deflecting element 65 at the first deflection angle is guided to the reflection mirror 673 via the transmission lenses 674 and 675, and the light beam returned by the reflection mirror 673 is guided to the deflecting element 65 via the transmission lenses 675 and 674. In consequence, the deflecting element 65 reflects the light beam once again, and the light beam is emitted toward the scanning lens 66 at the second deflection angle which is larger than the first deflection angle.

In this embodiment, for the purpose of making the transmission optical system 67 an afocal system, the transmission lenses 674 and 675 are formed by aspheric lenses which have the same structure, and are symmetrized with respect to an intermediate image position P3. To be more specific, the deflecting element 65 and the reflection mirror 673 are disposed away from each other by a distance (4 f). The symbol f denotes the focal length of each one of the transmission lenses 674 and 675. In addition, the transmission lens 674 is located closer toward the reflection mirror 673 by the distance f from the deflecting element 65, and the transmission lens 675 is located further away by a distance 2 f from the transmission lens 674. The image surfaces I4 and I5 respectively formed by the transmission lenses 674 and 675 are flat surfaces which are approximately perpendicular to the optical axis OA, and approximately coincide with each other at the intermediate image position P3. This ensures the afocal characteristic in the vicinity of the optical axis OA of the transmission optical system 67 of course and also at a location away from the optical axis OA.

The specific structure of the transmission optical system 67 exhibiting such a characteristic may be a structure which realizes optical data shown in Table 2.

TABLE 2

| SURFACE $S_i$ | RADIUS OF CURVATURE $r_i$ | SURFACE SEPARATION $d_i$ | INDEX OF REFRACTION $n_i$ |
|---|---|---|---|
| $S_0$ | | 15 | (DEFLECTION SURFACE) |
| $S_1$ | $r_1 = 21.62846$<br>$K_1 = 4.43549$<br>$A_1 = 0.114557 \times 10^3$<br>$B_1 = 0.533035 \times 10^6$ | 5 | 1.51452 |
| $S_2$ | $r_2 = -13.42498$<br>$K_2 = -0.961611$<br>$A_2 = 0.163854 \times 10^3$<br>$B_2 = 0.332179 \times 10^5$ | 30 | |
| $S_3$ | $r_2 = 13.42498$<br>$K_2 = -0.961611$<br>$A_2 = -0.163854 \times 10^3$<br>$B_2 = -0.332179 \times 10^5$ | 5 | 1.51452 |
| $S_4$ | $r_1 = -21.62846$<br>$K_1 = 4.43549$<br>$A_1 = -0.114557 \times 10^3$<br>$B_1 = -0.533035 \times 10^6$ | 15 | |
| $S_5$ | | | (REFLECTION SURFACE) |

In this design example, four surfaces S1 through S4 of the transmission lenses 674 and 675 which form the transmission optical system 67 are axisymmetric aspheric surfaces. The symbols used in the table denote the following:

Si: lens surface number (However, S0 denotes the deflection mirror surface 651 while S5 denotes the reflection surface 673a.)

ri: the radius of curvature of the lens surface i di: the axial distance from the lens surface i to the lens surface (i+1)

ni: the index of refraction of the lens surface i

Ki, Ai, Bi: the aspherical coefficients of the axisymmetric aspheric surfaces expressed by the following formula when the lens surface i is an axisymmetric aspheric surface $$z_i = \frac{y^2/r_i}{1+\sqrt{1-(K_i+1)(y/r_i)^2}} + A_i y^4 + B_i y^6$$

where the symbol z denotes a distance from the tangential plane to the aspheric surface apex among aspheric points which is at the height y from the optical axis.

As described above, in this embodiment, the transmission optical system 67 is formed by the reflection mirror 673 and the two aspheric lenses 674 and 675. In the transmission optical system 67, the transmission lenses 674 and 675 correspond to the "imaging element" of the present invention, and the transmission lenses 674 and 675 are disposed such that the image surfaces I4 and I5 respectively formed by the transmission lenses 674 and 675 approximately coincide with each other at the intermediate image position P3. This ensures the afocal characteristic in the vicinity of the optical axis OA of the transmission optical system 67 of course and also at a location away from the optical axis OA as described above. Hence, the light beam deflected by the deflecting element 65 at the position of reflection P1 is guided to the position of reflection P2 of the reflection mirror 673 via the transmission lenses 674 and 675. The light beam reflected by the reflection mirror 673 is returned without fail back to the position of reflection P1 once again via the transmission lenses 674 and 675. This achieves stable and favorable scanning with the light beam.

Further, in the second embodiment, the parallel light beam impinges upon the deflecting element 65 within a main-scanning cross sectional surface and is deflected by the deflecting element 65 at various angles, and the transmission optical system 67 returns thus deflected light beam as a parallel light beam to the deflection mirror surface 651 of the deflecting element 65. Hence, at any deflection angle, the parallel light beam is emitted from the deflecting element 65 toward the surface (surface-to-be-scanned) of the photosensitive member 2. The scanning lens 66 images this parallel light beam upon the surface of the photosensitive member 2 and make the parallel light beam scan in a desired spot diameter.

In addition, the second embodiment requires that the two transmission lenses 674 and 675 are formed by aspheric lenses having the same structure and are symmetrized with respect to the intermediate image position P3, which permits designing the lenses relatively simple and reduces the costs of the transmission lenses 674 and 675. This is advantageous to cost reduction of the exposure unit (optical scanning apparatus) 6, the image forming apparatus, etc.

<Third Embodiment>

Figure 11:
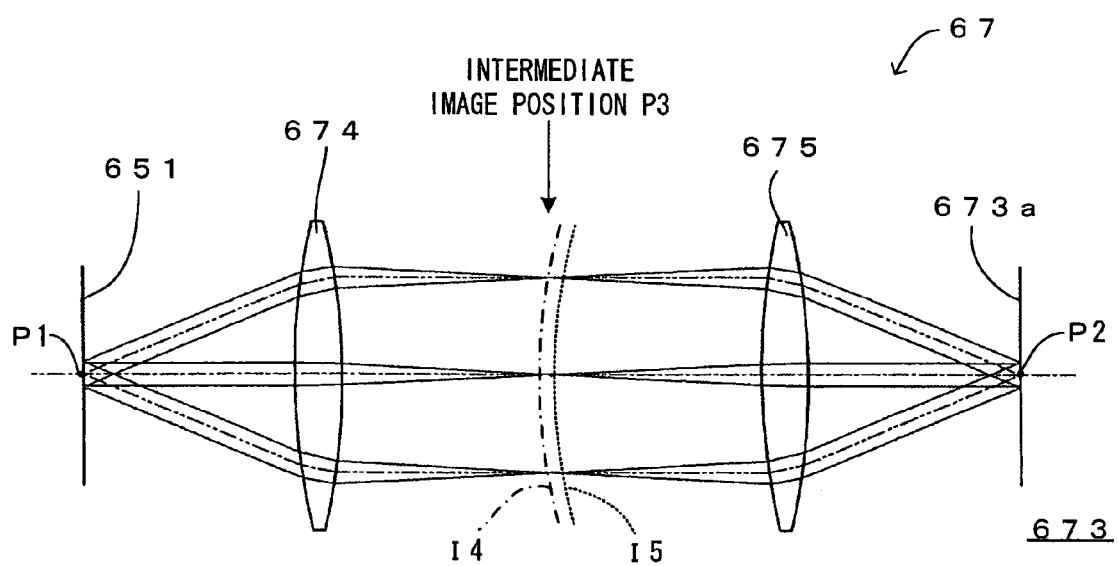
FIG. 11 is a drawing of a third embodiment of the optical scanning apparatus (exposure unit) according to the present invention.

FIG. 11 is a drawing of a third embodiment of the optical scanning apparatus (exposure unit) according to the present invention. A major difference of the third embodiment from the second embodiment is that as the "two imaging elements" of the present invention, one transmission lens 675 is formed by a spherical lens while the other transmission lens 674 is formed by an aspherical lens. In other words, in this embodiment, the image surface I5 formed by the transmission lens 675 at the intermediate image position P3 is curved as denoted at the broken line in FIG. 11. Therefore, the transmission lens (aspherical lens) 674 is formed so as to exhibit an imaging characteristic which corresponds to the image surface I5. Because of this, the image surfaces I4 and I5 formed by the transmission lenses 674 and 675 approximately coincide with each other at the intermediate image position P3, thereby achieving similar effects to those which are realized by the first embodiment. Although the image surface I4 (dashed line) and the image surface IS (dotted line) are away from each other in FIG. 11, this is merely for the convenience of illustration. In this embodiment, the image surfaces I4 and IS coincide with each other at the intermediate image position P3.

Further, since this embodiment uses a conventional and relatively inexpensive spherical lens as one transmission lens 675, the costs of the apparatus are reduced. Alternatively, the transmission lens 674 may be formed by a spherical lens and the transmission lens 675 may be formed by an spherical lens which exhibits an imaging characteristic corresponding to the image surface I4 which is formed by the transmission lens (spherical lens) 674 at the intermediate image position P3.

<Fourth Embodiment>

The transmission optical system used in the second and the third embodiments of the present invention may be replaced with the transmission optical system which is used in the first embodiment. A fourth embodiment will now be described in detail with reference to FIGS. 3 and 4. In the fourth embodiment, the transmission optical system 67 comprises the concave surface mirror 671 whose reflection surface 671a is directed toward the deflection mirror surface 651 and the transmission lens 672 which is disposed between the concave surface mirror 671 and the deflection mirror surface 651. As shown in FIGS. 3 and 4, the light beam deflected by the deflecting element 65 at the first deflection angle is guided to the concave surface mirror 671 via the transmission lens 672, and the light beam returned by the concave surface mirror 671 is guided to the deflecting element 65 via the transmission lens 672. In consequence, the deflecting element 65 reflects the light beam once again, and the light beam is emitted toward the surface (surface-to-be-scanned) 2a of the photosensitive member 2 at the second deflection angle which is larger than the first deflection angle.

In this embodiment, for the purpose of making the transmission optical system 67 an afocal system, one of the "two imaging elements" of the present invention is formed by the concave surface mirror 671 and the other one is the transmission lens 672. The transmission lens 672 is formed by an aspherical lens and exhibits an imaging characteristic which corresponds to the image surface formed by the concave surface mirror 671 at the intermediate image position P3. The concave surface mirror 671 and the transmission lens 672 are disposed such that the image surface formed by the transmission lens 672 approximately coincides with the image surface formed by the concave surface mirror 671 at the intermediate image position P3. This ensures the afocal characteristic in the vicinity of the optical axis OA of the transmission optical system 67 of course and also at a location away from the optical axis OA. Hence, similar effects to those which are realized by the second embodiment are obtained. In other words, the light beam deflected by the deflecting element 65 at the position of reflection P1 is returned without fail back to the position of reflection P1 once again via the transmission optical system 67. This achieves stable and favorable scanning with the light beam. Further, a parallel light beam impinges upon the deflecting element 65 within a main-scanning cross sectional surface and is deflected by the deflecting element 65 at various angles, and the transmission optical system 67 returns thus deflected light beam as a parallel light beam to the deflection mirror surface 651 of the deflecting element 65. Hence, at any deflection angle, the parallel light beam is emitted from the deflecting element 65 toward the surface (surface-to-be-scanned) 2a of the photosensitive member 2. It is therefore possible to form a spot having a desired diameter on the surface 2a of the photosensitive member 2 while making the spot scan in the main scanning direction X.

In the fourth embodiment, the transmission optical system 67 is comprised of the concave surface mirror 671 and the transmission lens 672. The transmission optical system 67 guides the light beam deflected by the deflecting element 65 to the concave surface mirror 671 via the transmission lens 672, and makes the light beam reflected by the reflection surface 671a of the concave surface mirror 671 incident upon the deflecting element 65 via the transmission lens 672, thereby increasing a deflection angle. In this manner, the transmission optical system 67 is formed by less lenses. In short, as compared with the second and the third embodiments according to which the two transmission lenses 674 and 675 are essential to form the transmission optical system, the transmission optical system 67 is formed using a smaller number of simple optical components. This also reduces the size of the transmission optical system 67, and hence, the exposure unit 6. Further, since less transmission lenses are required, it is possible to suppress the influence of chromatic aberration and realize stable scanning with the light beam.

Further, in the embodiment and the design example above, since the transmission lens 672 and the concave surface mirror 671 are disposed in such a manner that the focal point of the transmission lens 672 approximately coincides with the center of the concave surface mirror 671, the following effect is obtained: By means of this structure, the position of reflection P1 at which the deflecting element 65 reflects the light beam and the position of reflection P2 at which the concave surface mirror 671 reflects the light beam are approximately conjugated relative to each other. Hence, the light beam reflected by the deflecting element 65 at the particular position is guided back to this particular position by the transmission optical system 67, reflected at this particular position and emitted toward the imaging element. In other words, the light beam impinges upon the deflecting element 65 twice, each time at this particular position. This allows size reduction of the area of the deflecting element 65 where the light beam is reflected, and hence, size reduction of the deflecting element 65 and the apparatus. As the deflecting element 65 is made smaller and lighter, the speed at which the deflecting element 65 is driven further improves, thereby further enhancing the scanning speed of the light beam.

In addition, the transmission optical system 67 is disposed outside the scanning area which the scanning optical system (i.e., the deflecting element 65 and the scanning lens 66) scans with the light beam in this embodiment. This prevents interference between the light beam and the transmission optical system 67. This also simplifies incidence of the light beam upon the transmission optical system 67 and emission of the light beam from the transmission optical system 67, and therefore, achieves thickness reduction of the apparatus.

<Fifth Embodiment>

Figure 12:
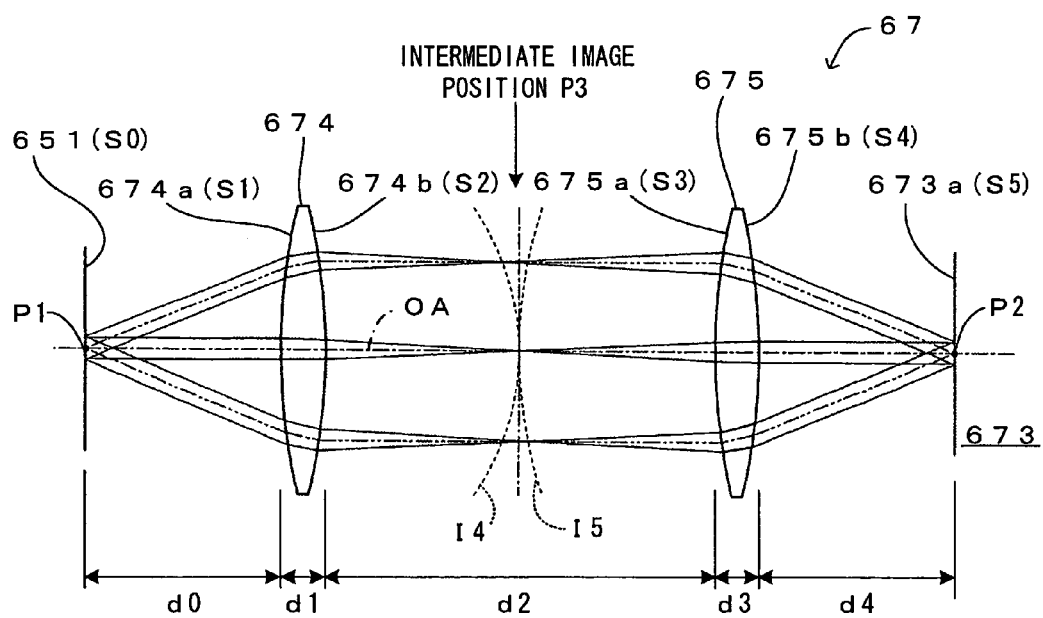
FIG. 12 is a drawing of a fifth embodiment of the optical scanning apparatus (exposure unit) according to the present invention.

FIG. 12 is a drawing of a fifth embodiment of the optical scanning apparatus (exposure unit) according to the present invention. A major difference of the fifth embodiment from the second embodiment is that for the purpose of making the transmission optical system 67 an afocal system in the vicinity of the optical axis OA, the transmission lenses 674 and 675 are formed by aspheric lenses having the same structure and are symmetrized with respect to the intermediate image position P3. To be more specific, the deflecting element 65 and the reflection mirror 673 are disposed away from each other by a distance (4 f). The symbol f denotes the focal length of each one of the transmission lenses 674 and 675. In addition, the transmission lens 674 is located closer toward the reflection mirror 673 by the distance f from the deflecting element 65, and the transmission lens 675 is located further away by a distance 2 f from the transmission lens 674.

At a location away from the optical axis OA, to correct curvature of field of the scanning lens 66, the image surfaces I4 and I5 are formed by the transmission lenses 674 and 675 respectively as concave surfaces which are concave toward the optical axis. Further, on the optical axis OA, while the image surfaces I4 and I5 coincide with each other at the intermediate image position P3, the image surfaces I4 and I5 become increasingly apart from each other with a distance from the optical axis OA. Owing to this structure, the light beam guided by the transmission optical system 67 to the deflecting element 65 diverges depending upon the angle of deflection of the light beam. In short, while the parallel light beam impinges upon the deflecting element 65 from the beam shaper system 63 in the main scanning direction, the light beam returned back to the deflection mirror surface 651 via the transmission optical system 67 diverges at an angle which changes in accordance with the deflection angle. To be more specific, a parallel light beam returns to the deflection mirror surface 651 while there is a light beam which propagates ahead along the optical axis OA (i.e., when the deflection angle is zero), and as the absolute value of the deflection angle increases, the light beam returned to the deflection mirror surface 651 becomes a divergent light beam whose angle of divergence increases in accordance with the deflection angle.

The specific structure of the transmission optical system 67 exhibiting such a characteristic may be a structure which realizes optical data shown in Table 3.

TABLE 3

| SURFACE $S_i$ | RADIUS OF CURVATURE $r_i$ | SURFACE SEPARATION $d_i$ | INDEX OF REFRACTION $n_i$ |
|---|---|---|---|
| $S_0$ | | 15 | (DEFLECTION SURFACE) |
| $S_1$ | $r_1 = 21.54998$ $K_1 = 4.127226$ $A_1 = 0.737366 \times 10^4$ $B_1 = 0.506220 \times 10^6$ | 5 | 1.51452 |
| $S_2$ | $r_2 = -13.44330$ $K_2 = -3.262255$ $A_2 = 0.309888 \times 10^4$ $B_2 = 0.303453 \times 10^5$ | 30 | |
| $S_3$ | $r_2 = 13.44330$ $K_2 = -3.262255$ $A_2 = -0.309888 \times 10^4$ $B_2 = -0.303453 \times 10^5$ | 5 | 1.51452 |
| $S_4$ | $r_1 = -21.54998$ $K_1 = 4.127226$ $A_1 = -0.737366 \times 10^4$ $B_1 = -0.506220 \times 10^6$ | 15 | |
| $S_5$ | | | (REFLECTION SURFACE) |

In this design example, four surfaces S1 through S4 of the transmission lenses 674 and 675 which form the transmission optical system 67 are axisymmetric aspheric surfaces. The symbols used in the table denote the following:

Si: lens surface number (However, S0 denotes the deflection mirror surface 651 while S5 denotes the reflection surface 673a.)

ri: the radius of curvature of the lens surface i di: the axial distance from the lens surface i to the lens surface (i+1)

ni: the index of refraction of the lens surface i

Ki, Ai, Bi: the aspherical coefficients of the axisymmetric aspheric surfaces expressed by the following formula when the lens surface i is an axisymmetric aspheric surface $$z_i = \frac{y^2/r_i}{1 + \sqrt{1 - (K_i + 1)(y/r_i)^2}} + A_i y^4 + B_i y^6$$

where the symbol z denotes a distance from the tangential plane to the aspheric surface apex among aspheric points which is at the height y from the optical axis.

As described above, in this embodiment, after the deflecting element 65 has deflected the light beam twice on the light source side to the scanning lens 66 which is the imaging means, the scanning lens 66 images the deflected light beam on the surface (surface-to-be-scanned) of the photosensitive member 2. While in this transmission optical system 67, the light beam deflected at the deflection mirror surface 651 is guided back to the deflection mirror surface 651 again, the light beam thus impinges twice and the deflection angle accordingly increases, since the transmission optical system 67 contributes to correction of curvature of field on the surface 2a of the photosensitive member 2, the following effect is obtained. This will now be described with reference to FIGS. 13A and 13B.

The deflection mirror surface 651 deflects the parallel light beam from the beam shaper system 63, and the transmission optical system 67 then makes this light impinge as a parallel light beam upon the deflection mirror surface 651 again. In consequence, the light beam is emitted from the deflection mirror surface 651 toward the scanning lens 66. In the event that no correction is realized by the transmission optical system 67 (the apparatus described in U.S. Pat. No. 3,771,850), at any deflection angle, the light beam LB from the deflection mirror surface 651 remains parallel. Hence, an image surface I formed by the scanning lens 66 is a concave surface which is concave in the direction of the optical axis, as denoted at the broken line in FIG. 13A. In short, this is direct transfer of curvature of field created by the scanning lens 66. Because of this, the diameter of the spot formed on the surface 2a of the photosensitive member 2 increases as the deflection angle increases, thereby deteriorating the quality of an image.

In contrast, in this embodiment, the transmission optical system 67 has such a structure which makes the light beam guided to the deflecting element 65 by the transmission optical system 67 diverge in accordance with the deflection angle, and therefore, the light beam LB emitted from the deflection mirror surface 651 toward the scanning lens 66 is an approximately parallel light beam while the deflection angle is zero (i.e., during propagation ahead along the optical axis) but becomes a divergent light beam as the deflection angle increases as shown in FIG. 13B. Hence, as the deflection angle becomes large, the imaging position of the light beam moves toward the surface 2a (surface-to-be-scanned) of the photosensitive member 2 and the image surface I formed by the scanning lens 66 approximately coincides with the surface 2a of the photosensitive member. This achieves excellent scanning with the light beam.

Further, in this embodiment, the transmission optical system 67 exhibits such an imaging characteristic which corrects curvature of field created by the scanning lens 66, and a load required for reduction of curvature of the image surface I attributed to imaging of the light beam is distributed between the scanning lens 66 and the transmission optical system 67. Since the transmission optical system 67 thus bears a part of the load, the simple structure achieves excellent scanning with the light beam without using a complex lens system as the scanning lens 66 or adding an optical element such as a lens to the optical scanning apparatus.

<Sixth Embodiment>

The transmission optical system used in the fifth embodiment may be replaced with the transmission optical system which is used in the first embodiment. A sixth embodiment will now be described in detail with reference to FIGS. 3 and 4. In the sixth embodiment, the transmission optical system 67 comprises the concave surface mirror 671 whose reflection surface 671a is directed toward the deflection mirror surface 651 and the transmission lens 672 which is disposed between the concave surface mirror 671 and the deflection mirror surface 651. As shown in FIGS. 3 and 4, the light beam deflected by the deflecting element 65 at the first deflection angle is guided to the concave surface mirror 671 via the transmission lens 672, and the light beam returned by the concave surface mirror 671 is guided to the deflecting element 65 via the transmission lens 672. In consequence, the deflecting element 65 reflects the light beam once again, and the light beam is emitted toward the surface (surface-to-be-scanned) 2a of the photosensitive member 2 at the second deflection angle which is larger than the first deflection angle.

In this embodiment, for the purpose of making the transmission optical system 67 an afocal system, one of the optical elements which form the transmission optical system 67 is the concave surface mirror 671 and the other one is the transmission lens 672. The transmission lens 672 is formed by an aspherical lens, and the image surface formed by the transmission lens 672 is a concave surface which is concave in the direction of the optical axis. Therefore, as in the fifth embodiment, curvature of field of the scanning lens 66 is corrected and the image surface I formed by the scanning lens 66 approximately coincides with the surface 2a of the photosensitive member. Thus, the simple structure achieves excellent scanning with the light beam, which is a similar effect to that realized by the fifth embodiment.

<Seventh Embodiment>

While the fifth and the sixth embodiments above are directed to an optical scanning apparatus of the so-called pre-objective scan type, the present invention is not limited only to this application but may be applied also to an optical scanning apparatus of the so-called post-objective scan type. This will now be described in detail with reference to FIGS. 14, 15A and 15B.

Figure 14:
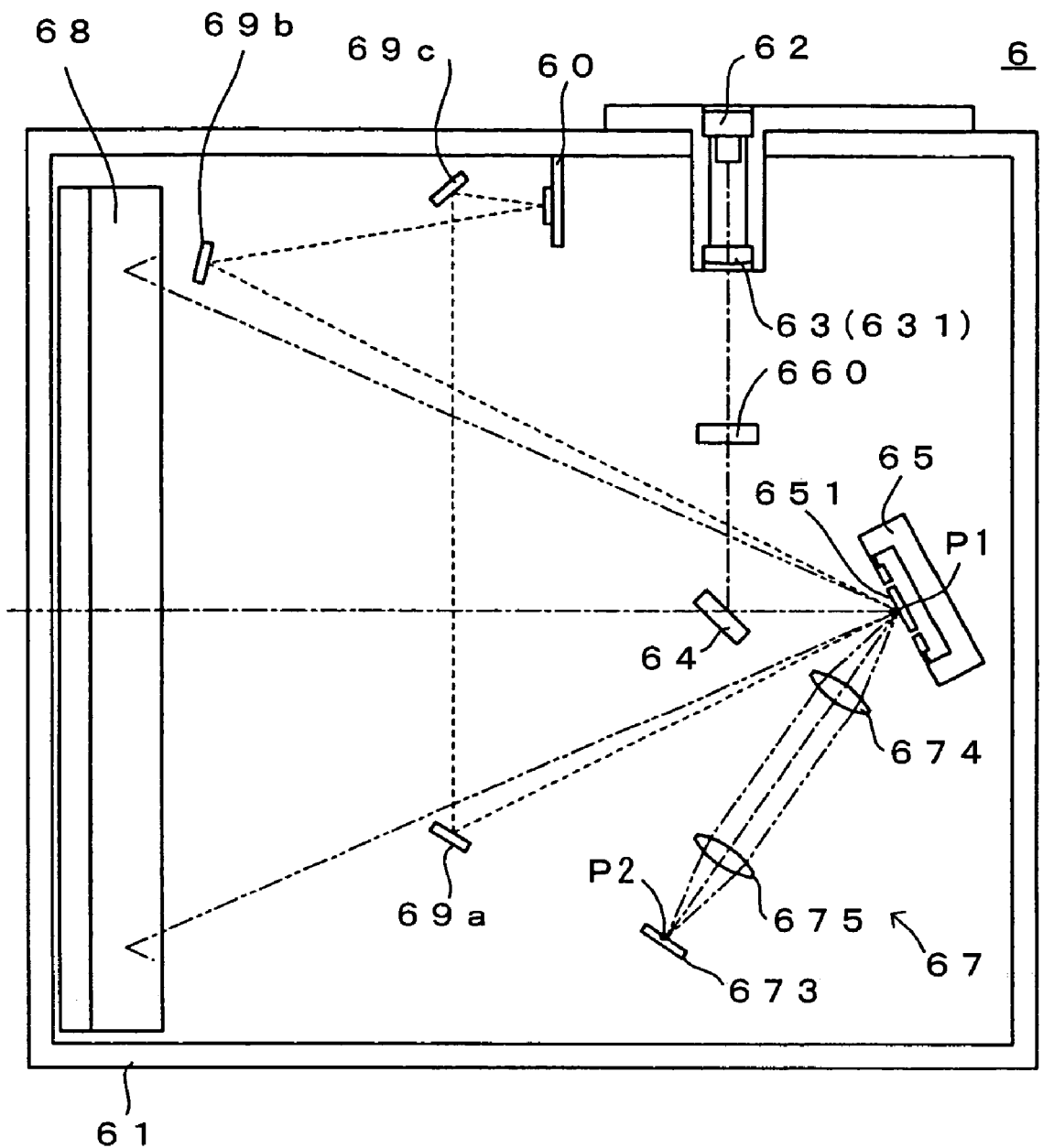
FIG. 14 is a drawing of a seventh embodiment of the optical scanning apparatus according to the present invention.

FIG. 14 is a drawing of a seventh embodiment of the optical scanning apparatus according to the present invention. A major difference of the seventh embodiment from the fifth embodiment lies in the following two points, and the other structures are the same as those according to the fifth embodiment. Hence, the differences will be described below in detail, and the same structures will be denoted at the same references but will not be described.

The first difference is that instead of the scanning lens, a condenser lens 660 is disposed on the light source side to the deflecting element 65. In this apparatus, before deflected by the deflecting element 65, the light beam is condensed by the condenser lens 660 and imaged on the surface (surface-to-be-scanned) of the photosensitive member 2 via the deflection mirror surface 651, the transmission optical system 67 and again the deflection mirror surface 651.

The second difference is that the transmission optical system 67 exhibits such an imaging characteristic which corrects curvature of field of the condenser lens 660 which functions as the "imaging means" of the present invention. The transmission optical system 67 more specifically exhibits such an imaging characteristic which decreases the condensing angle of the light beam which is guided to the deflecting element 65 in accordance with the deflection angle of the light beam. In this embodiment, while the transmission optical system 67 thus guides the light beam deflected at the deflection mirror surface 651 back to the deflection mirror surface 651 again and makes the light beam incident twice in an effort to increase the deflection angle, since the transmission optical system 67 contributes to correction of curvature of field on the surface 2a of the photosensitive member 2, the following effect is obtained. This will now be described with reference to FIGS. 15A and 15B.

In an apparatus of the post-objective scan type, a convergent light beam impinges upon the deflecting element 65, and the convergent light beam is guided as it is to the surface (surface-to-be-scanned) 2a of the photosensitive member 2. Therefore, in the event that no correction is achieved by the transmission optical system 67 (the apparatus described in Patent Document 1), at any deflection angle, a light beam LB is converged at a constant converging angle and imaged. Because of this, the image surface I formed by the scanning lens 66 is a concave surface which is concave in the direction of the optical axis, as denoted at the broken line in FIG. 15A. This is direct transfer of curvature of field created by the condenser lens 660. Hence, the diameter of the spot imaged on the surface 2a of the photosensitive member 2 increases as the deflection angle increases, thereby deteriorating the quality of an image.

In contrast, in this embodiment, since the condensing angle of the light beam guided to the deflecting element 65 from the transmission optical system 67 decreases in accordance with the deflection angle of the light beam, the condensing angle of the light beam LB emitted toward the surface 2a of the photosensitive member 2 from the deflection mirror surface 651 reaches the maximum value θ0 when the deflection angle is zero (i.e., during propagation ahead along the optical axis), decreases as the deflection angle increases, and becomes θ(+a) or θ(−a) at the maximum deflection angle as shown in FIG. 15B. Hence, as the deflection angle increases, the imaging position of the light beam moves toward the surface 2a (surface-to-be-scanned) of the photosensitive member 2 and the image surface I formed by the condenser lens 660 approximately coincides with the surface 2a of the photosensitive member. This achieves excellent scanning with the light beam.

Further, in this embodiment, the transmission optical system 67 exhibits such an imaging characteristic which corrects curvature of field created by the condenser lens 660, and a load required for reduction of curvature of the image surface I attributed to imaging of the light beam is distributed between the condenser lens 660 and the transmission optical system 67. Since the transmission optical system 67 thus bears a part of the load, the simple structure achieves excellent scanning with the light beam without using a complex lens system as the condenser lens 660 or adding an optical element such as a lens to the optical scanning apparatus.

<Eighth Embodiment>

Figure 16:
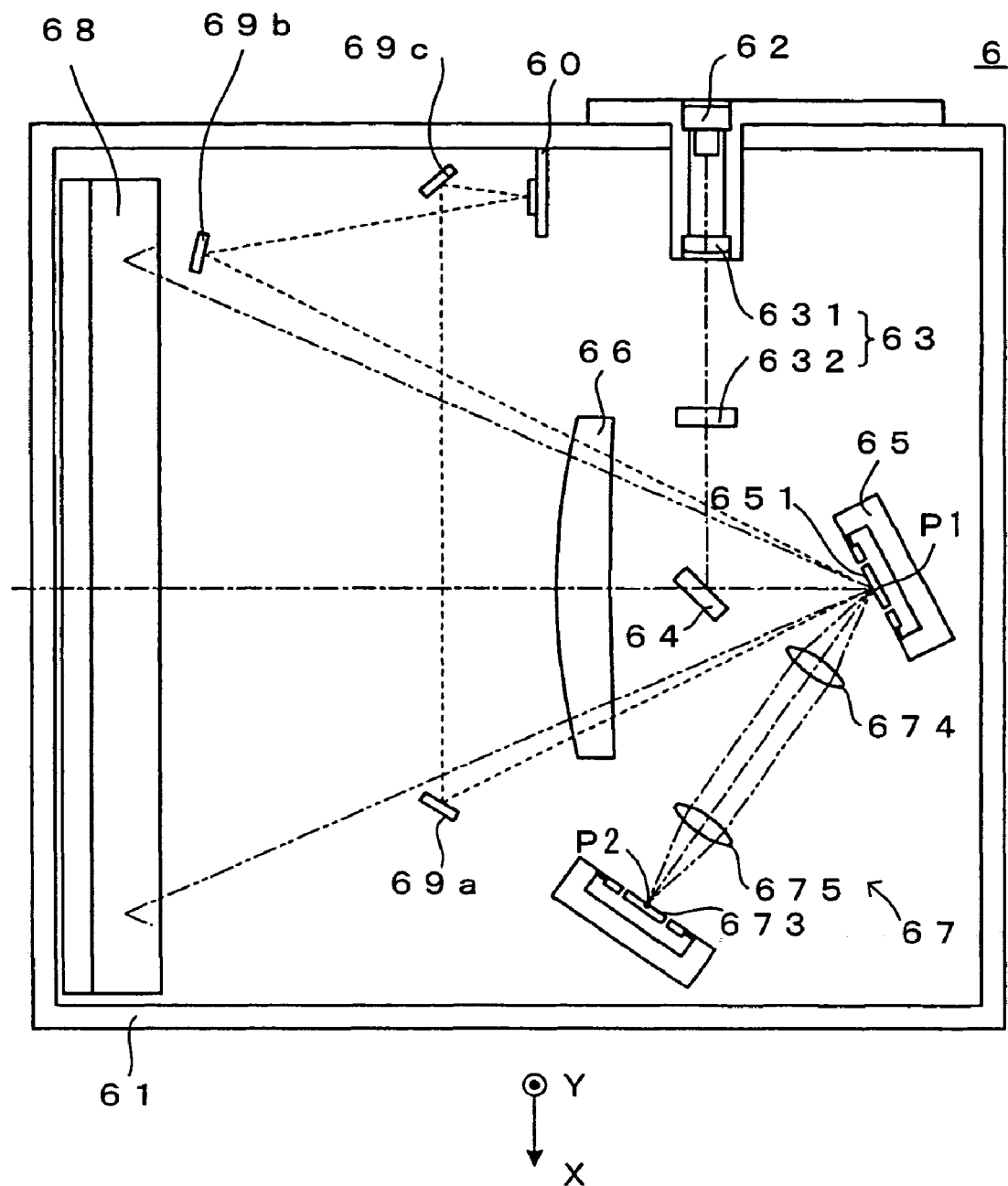
FIG. 16 is a drawing of an eighth embodiment of the optical scanning apparatus according to the present invention.

Although the second, the third, the fifth and the seventh embodiments described above require fixing of the reflection mirror 673, the following structure may be used instead. FIG. 16 is a drawing of an eighth embodiment of the optical scanning apparatus according to the present invention. A major difference of the eighth embodiment from the embodiment described above is that the reflection mirror 673 is capable of pivoting about an axis which is approximately parallel to the main scanning/deflection axis (first axis) AX1 of the deflecting element 65 and when driven by a driver (not shown) of the exposure controller 102, the reflection mirror 673 pivots in association with the pivoting action of the deflection mirror surface 651, and the other structures are the same as those according to the first embodiment. The reflection mirror 673 may have the same structure as those of the deflecting element 65 and a deflector such as a galvano-mirror. Use of this structure further increase the deflection angle of a light beam.

<Ninth Embodiment>

Although the first through the eighth embodiments utilize electromagnetic force to drive the deflection mirror surface 651, the deflection mirror surface 651 may be driven by means of other drive force such as electrostatic adsorption and mechanical force. An embodiment regarding use of electrostatic adsorption will now be described.

Figure 17:
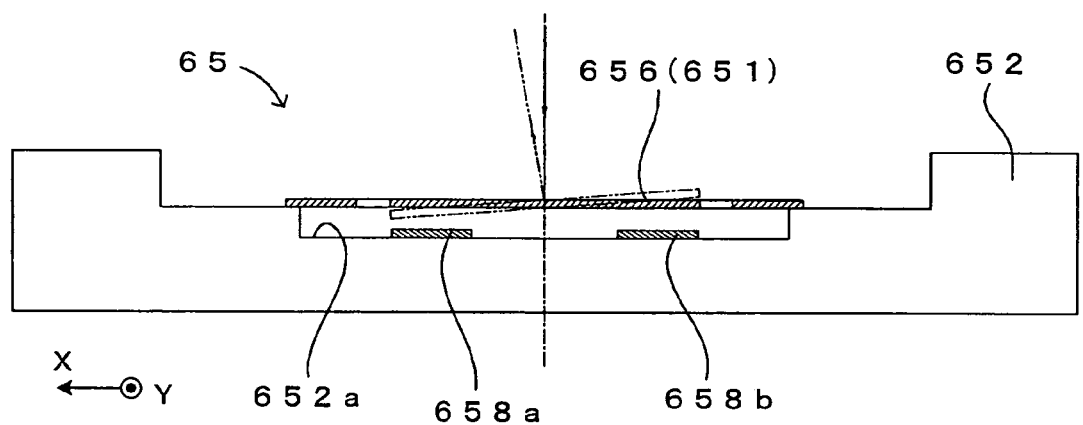
FIG. 17 is a drawing of a ninth embodiment of the optical scanning apparatus according to the present invention.

FIG. 17 is a drawing of a ninth embodiment of the optical scanning apparatus according to the present invention. A major difference of the ninth embodiment from the embodiments described above is that electrostatic adsorption drives the deflection mirror surface 651, and the other structures are the same as those according to the embodiments described above. In the ninth embodiment, as shown in FIG. 17, the movable plate 656 which is obtained by partially processing the silicon substrate 652 is disposed within the deflecting element 65. The movable plate 656 is like a flat panel, elastically supported to the silicon substrate 652 by the helical spring 657, and capable of freely pivoting about the first axis AX1 which is approximately parallel to the sub scanning direction Y Further, in a central portion or the top surface of the movable plate 656, an aluminum film or the like is disposed as the deflection mirror surface 651.

At locations opposed against the both edge portions of the movable plate 656, electrodes 658a and 658b are fixed to the inner bottom surface of the recess 652a of the silicon substrate 652. The two electrodes 658a and 658b function as electrodes which drive the movable plate 656 into a pivoting action about the first axis AX1. In short, these electrodes 658a and 658b are electrically connected with a driver (not shown) of the exposure controller 102, and when a voltage is applied to one electrode, electrostatic adsorption force acts between this electrode and the deflection mirror surface 651 and one edge portion of the deflection mirror surface 651 is pulled toward this electrode. Hence, alternating application of a predetermined voltage from the driver upon the electrodes 658a and 658b vibrates the deflection mirror surface 651 reciprocally about the first axis AX1 which is the helical spring 657. When the drive frequency of the reciprocal vibrations is set to the resonance frequency of the deflection mirror surface 651, the deflection mirror surface 651 vibrates at a large amplitude, thereby displacing the edge portions of the deflection mirror surface 651 to positions which are close to the electrodes 658a and 658b. In addition, as the edge portions of the deflection mirror surface 651 reach the positions close to the electrodes 658a and 658b owing to resonance, the electrodes 658a and 658b as well contribute to driving of the deflection mirror surface 651. Thus, by means of the edge portions and the electrodes disposed to the flat portion, the vibrations are maintained in a more stable manner.

Electromagnetic force, electromagnetic force or the like is used to make the deflection mirror surface 651 pivot as described above, and any desired one of these may be used. However, since each drive method has its own features, it is preferable that one of these is chosen considering the features of the respective drive methods. That is, when electromagnetic force is used as the drive force for making the deflection mirror surface 651 pivot, it is possible to drive the deflection mirror surface 651 into a pivoting action at a lower drive voltage than that used where electrostatic adsorption force is developed, voltage controls is therefore easy and the accuracy of positioning a scanning light beam enhances. In contrast, when electrostatic adsorption force is used as the drive force, it is not necessary to form the coil pattern, the deflecting element 65 is fabricated even smaller, and deflection/scanning becomes faster. To drive the deflection mirror surface 651 into the pivoting action, an alternative structure may be used that the deflection mirror surface 651 is driven to pivot about the main scanning/deflection axis in a resonance mode. The alternative structure achieves pivoting of the deflection mirror surface 651 about the main scanning/deflection axis with less energy, and stabilizes the cycles of main scanning of the scanning light beam.

<Tenth Embodiment>

While the deflecting element 65 processed with a micro machining technique is used as the deflecting element which reflects a light beam and then deflects the light beam in the first through the ninth embodiments above, a deflecting element which is customarily in popular use such as a galvano-mirror may be used instead. Further, although the deflecting element 65 used the first and the ninth embodiments is a deflecting element which pivots about the main scanning/deflection axis when driven, a deflecting element 65A which is capable of deflecting not only about the main scanning/deflection axis but in the sub scanning direction Y as well may be used instead of the deflecting element 65 described above as shown in FIG. 18.

Figure 18:
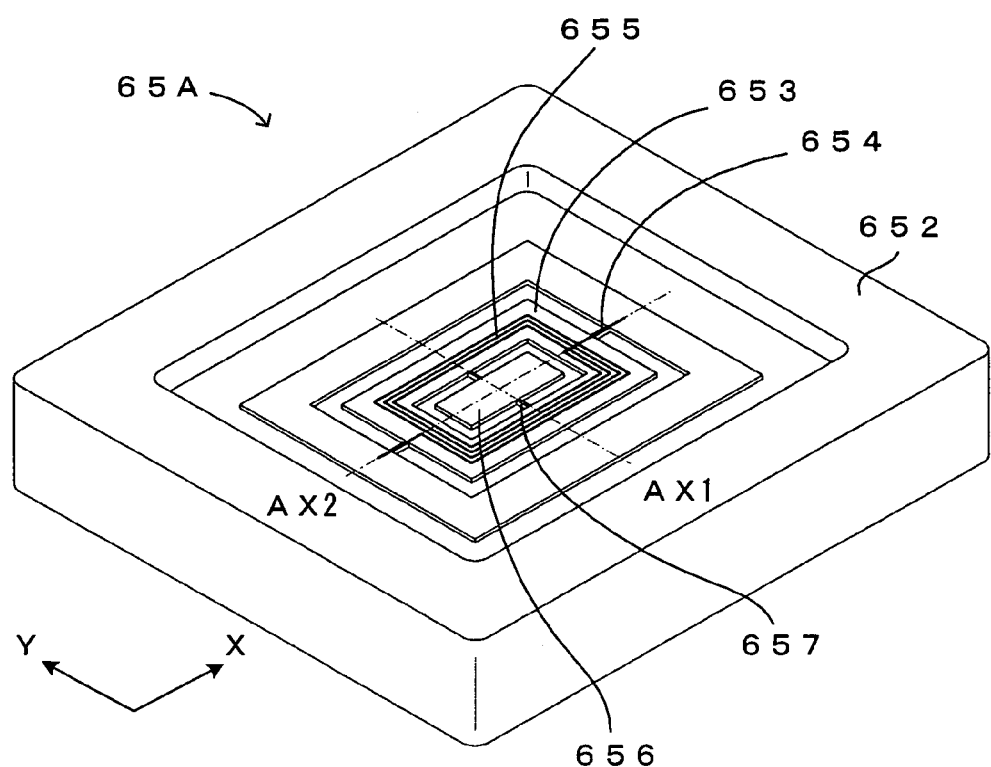
FIG. 18 is a drawing of a tenth embodiment of the optical scanning apparatus according to the present invention.
Figure 19:
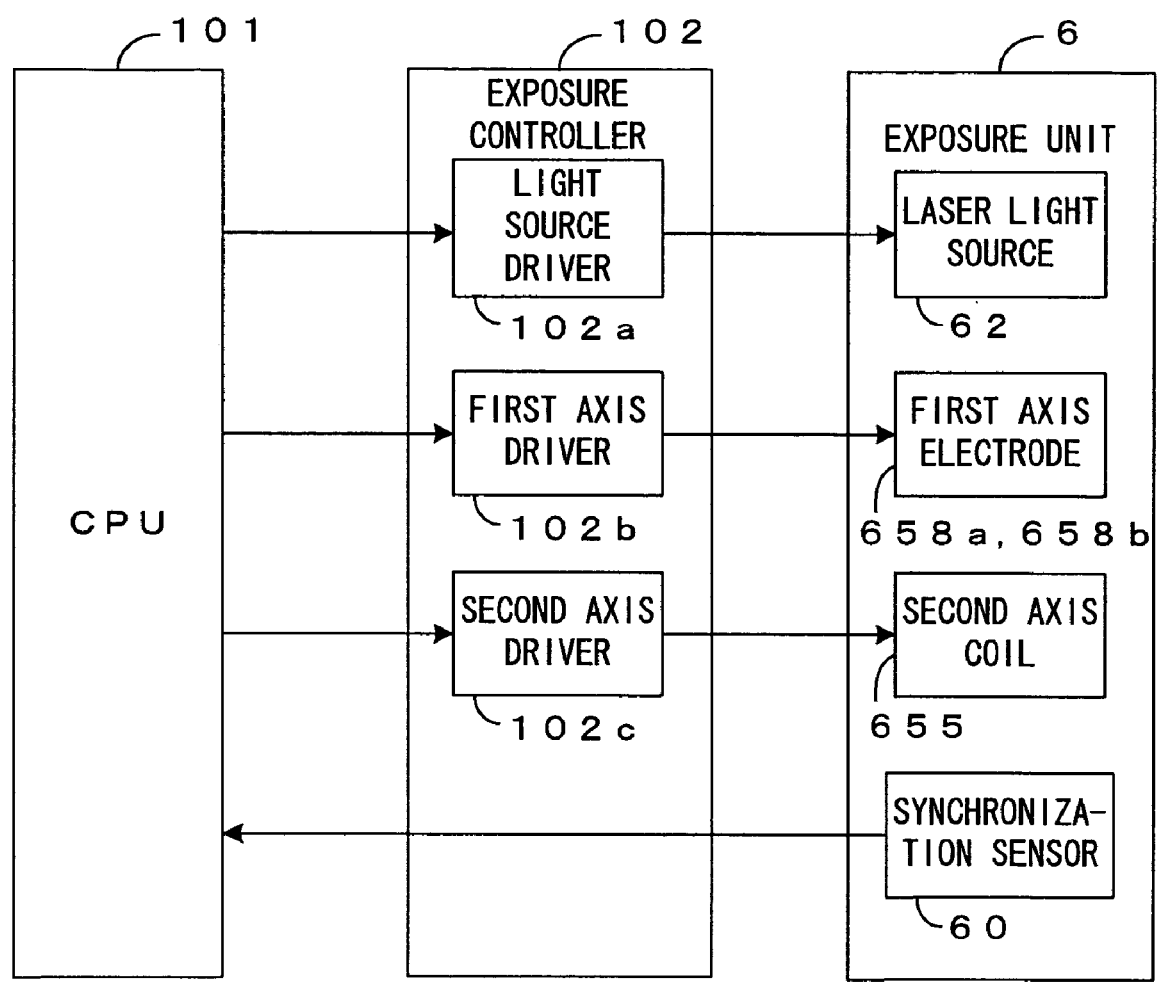
FIG. 19 is a block diagram showing the structure of an exposure unit and an exposure controller in the tenth embodiment.

FIG. 18 is a drawing of a tenth embodiment of the optical scanning apparatus according to the present invention. FIG. 19 is a block diagram showing the structure of the exposure unit and the exposure controller in the tenth embodiment. A major difference of this embodiment from the embodiments described above is that the deflection mirror surface 651 can pivot about two axes, and the other structures are similar to those according to the embodiments described above. In this embodiment, as shown in these drawings, an external movable plate 653 which is obtained by partially processing the silicon substrate 652 is disposed. The external movable plate 653 is shaped like a frame, elastically supported to the silicon substrate 652 by a torsion spring 654, and capable of freely pivoting about a second axis AX2 which is approximately parallel to the main scanning direction X. In the top surface of the external movable plate 653, as a "second axis drive coil," the flat coil 655, which is electrically connected via the torsion spring 654 with a pair of outside electrode terminals (not shown) formed in the top surface of the silicon substrate 652, is disposed and coated with an insulation layer.

On the inner side to the external movable plate 653, an internal movable plate 656 shaped like a flat plate is axially supported. To be more specific, the internal movable plate 656 is elastically supported inside the external movable plate 653 by the helical spring 657 whose axial direction is perpendicular to the torsion spring 654 so that the internal movable plate 656 can freely pivot about the first axis AX1 which is approximately parallel to the sub scanning direction Y In a central portion of the internal movable plate 656, an aluminum film or the like is disposed as the deflection mirror surface 651.

Further, as in the embodiments described above, there is the recess 652a in an approximately central portion of the silicon substrate 652, whereby the external movable plate 653 and the internal movable plate 656 can pivot respectively about the second axis AX2 and the first axis AX1. At locations opposed against the both edge portions of the internal movable plate 656, the electrodes 658a and 658b are fixed to the inner bottom surface of the recess 652a (See FIG. 17.). These two electrodes 658a and 658b function as "first axis electrodes" which are for driving the internal movable plate 656 into a pivoting action about the first axis AX1. In other words, these first axis electrodes 658a and 658b are electrically connected with a first driver 102b of the exposure controller 102, and therefore, when a voltage is applied to one electrode, electrostatic adsorption force acts between this electrode and the deflection mirror surface 651 and one edge portion of the deflection mirror surface 651 is pulled toward this electrode. Hence, alternating application of a predetermined voltage from the first driver 102b upon the first axis electrodes 658a and 658b vibrates the deflection mirror surface 651 reciprocally about the first axis AX1 which is the helical spring 657. When the drive frequency of the reciprocal vibrations is set to the resonance frequency of the deflection mirror surface 651, the deflection mirror surface 651 vibrates at a large amplitude, thereby displacing the edge portions of the deflection mirror surface 651 to positions which are close to the electrodes 658a and 658b. In addition, as the edge portions of the deflection mirror surface 651 reach the positions close to the electrodes 658a and 658b owing to resonance, the electrodes 658a and 658b as well contribute to driving of the deflection mirror surface 651. Thus, by means of the edge portions and the electrodes disposed to the flat portion, the vibrations are maintained in a more stable manner.

In the inner bottom surface of the recess 652a, the permanent magnets 659a and 659b are fixed in mutually different directions at outer positions to the both edge portions of the external movable plate 653. The second axis drive coil 655 is electrically connected with a second driver 102c of the exposure controller 102, due to which as the coil 655 is energized, Lorentz's force acts because of the direction of the current flowing in the second axis drive coil 655 and the direction of magnetic flux created by the permanent magnets 659a and 659b and moment accordingly develops which rotates the external movable plate 653. At this stage, the internal movable plate 656 (the deflection mirror surface 651) as well is twisted together with the external movable plate 653 and pivots about the torsion spring 654 which is the second axis AX2. When an alternating current is supplied as the current flowing in the second axis drive coil 655 for continuous cyclic operations, the deflection mirror surface 651 vibrates reciprocally about the torsion spring 654 which is the second axis AX2.

In this manner, the deflection mirror surface 651 of the deflecting element 65 can be driven to pivot independently about the first axis AX1 and the second axis AX2 which are perpendicular to each other. Therefore, in this embodiment, with the mirror driver formed by the first driver 102b and the second driver 102c controlled, the deflection mirror surface 651 is driven about the first axis AX1 and the light beam is deflected and scans in the main scanning direction X. When the deflection mirror surface 651 is made pivot about the second axis AX2, it is possible to adjust the location of the scanning light beam on the photosensitive member 2 in the sub scanning direction Y In this embodiment, the first axis AX1 thus functions as the main scanning/deflection axis. Meanwhile, the second axis AX2 is used as a fine adjustment axis and the deflecting element 65 functions as the "fine adjustment mechanism" of the present invention. Of course, the first axis AX1 may be used as the fine adjustment axis and the second axis AX2 may function as the fine adjustment mechanism.

<Others>

The present invention is not limited to the preferred embodiments above, but may be modified in various manners in addition to the preferred embodiments above, to the extent not deviating from the object of the invention. For instance, although the foregoing has described the first through the tenth embodiments above in relation to an optical scanning apparatus of multiple-incidence type, the present invention is not limited to this application but rather generally includes optical scanning apparatuses which realize multiple incidence using transmission optical systems.

Further, while the optical scanning apparatus according to the present invention is used as an exposure unit of a color image forming apparatus in the embodiments above, the present invention is not limited to this application. In other words, the optical scanning apparatus according to the present invention may be used as exposure means of an image forming apparatus in which an electrostatic latent image is formed as a latent image carrier such as a photosensitive member is scanned with a light beam and the electrostatic latent image is developed with toner to thereby form a toner image. Of course, the optical scanning apparatus is not limitedly applied to exposure means of an image forming apparatus but may generally be any optical scanning apparatus which makes a light beam scan a surface-to-be-scanned.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An optical scanning apparatus, comprising:
a scanning optical system, including a deflecting element which reflects a light beam to deflect the light beam and an imaging element which images the light beam on a surface-to-be-scanned, which scans the light beam on the surface-to-be-scanned in a main scanning direction; and
a transmission optical system which guides the light beam deflected by the deflecting element toward the deflecting element,
wherein the transmission optical system comprises a concave surface mirror and a transmission lens, the concave surface mirror being disposed such that a reflection surface of the concave surface mirror is directed toward the deflecting element, the transmission lens being disposed between the concave surface mirror and the deflecting element, and
wherein the light beam deflected by the deflecting element is guided to the concave surface mirror via the transmission lens while the light beam returned by the concave surface mirror is guided to the deflecting element via the transmission lens, thereby ensuring that the deflection angle of the light beam emitted toward the surface-to-be-scanned after deflected by the deflecting element once again becomes larger than the deflection angle of the light beam impinging upon the transmission optical system.

2. The optical scanning apparatus of claim 1, wherein a position of reflection at which the deflecting element reflects the light beam is approximately conjugated with a position of reflection at which the concave surface mirror reflects the light beam.

3. The optical scanning apparatus of claim 2, wherein the transmission lens and the concave surface mirror are disposed in such a manner that the focal point of the transmission lens approximately coincides with the center of the concave surface mirror.

4. The optical scanning apparatus of claim 1, wherein the transmission optical system is disposed outside a scanning area which the scanning optical system scans with the light beam.

5. The optical scanning apparatus of claim 1, wherein the transmission lens is an aspherical lens.

6. The optical scanning apparatus of claim 1, wherein the position of reflection at which the deflecting element reflects the light beam is approximately conjugated with the surface-to-be-scanned within a sub scanning plane which is approximately perpendicular to the scanning direction in which the scanning optical system scans with the light beam.

7. The optical scanning apparatus of claim 1, wherein the deflecting element comprises:
a movable member which has a deflection mirror surface which reflects the light beam;
a support member which supports the movable member such that the movable member can freely pivot about a main scanning/deflection axis which is approximately perpendicular to the scanning direction of the light beam; and
a mirror driver which drives the movable member and makes the movable member pivot about the main scanning/deflection axis,
wherein the mirror driver makes the deflection mirror surface pivot about the main scanning/deflection axis, whereby the light beam scans in the main scanning direction.

8. The optical scanning apparatus of claim 1, wherein the deflecting element comprises:
an internal movable member which has a deflection mirror surface which reflects the light beam;
an external movable member which supports the internal movable member in such a manner that the internal movable member can freely pivot about a first axis;
a support member which supports the external movable member such that the external movable member can freely pivot about a second axis which is different from the first axis; and
a mirror driver which drives the internal movable member and makes the internal movable member pivot about the first axis and drives the external movable member and makes the external movable member pivot about the second axis,
wherein the mirror driver makes the deflection mirror surface pivot about one of the first and the axes which serves as the main scanning/deflection axis, thereby causing the light beam to scan in the main scanning direction, while driving the deflection mirror surface into a pivoting action about the other one which serves as a fine adjustment axis, thereby correcting the orientation of the light beam from the deflection mirror surface.

9. The optical scanning apparatus of claim 7, wherein the movable member and the support member are made of single crystal silicon.

10. The optical scanning apparatus of claim 7, wherein the mirror driver drives the deflection mirror surface into a pivoting action about the main scanning/deflection axis in a resonance mode.

11. The optical scanning apparatus of claim 7, wherein the mirror driver drives the deflection mirror surface into a pivoting action about the main scanning/deflection axis, using electromagnetic force.

12. The optical scanning apparatus claim 7, wherein the mirror driver drives the deflection mirror surface into a pivoting action about the main scanning/deflection axis, using electrostatic adsorption force.

13. The optical scanning apparatus of claim 8, wherein the mirror driver registers the deflection mirror surface to a pivot position about the fine adjustment axis in a non-resonance mode.

14. The optical scanning apparatus of claim 8, wherein the mirror driver registers the deflection mirror surface to a pivot position about the fine adjustment axis, using electromagnetic force.

15. The optical scanning apparatus of claim 8, wherein the mirror driver registers the deflection mirror surface to a pivot position about the fine adjustment axis, using electrostatic adsorption force.

16. An image forming apparatus, comprising:
a latent image carrier;
an exposure unit, having the same structure as the optical scanning apparatus of claim 1, which makes the light beam scan on a surface of the latent image carrier as the surface-to-be-scanned and accordingly forms an electrostatic latent image on the latent image carrier; and
a developer unit which develops the electrostatic latent image with toner, thereby forming a toner image.

* * * * *